(12) United States Patent
Xue et al.

(10) Patent No.: US 10,390,344 B2
(45) Date of Patent: Aug. 20, 2019

(54) CARRIER CONFIGURATION METHOD, BASE STATION, AND USER EQUIPMENT

(71) Applicant: Huawei Technologies Co., Ltd., Shenzhen (CN)

(72) Inventors: Lixia Xue, Beijing (CN); Lei Guan, Beijing (CN); David Jean-Marie Mazzarese, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 359 days.

(21) Appl. No.: 15/018,665

(22) Filed: Feb. 8, 2016

(65) Prior Publication Data

US 2016/0157235 A1    Jun. 2, 2016

Related U.S. Application Data

(63) Continuation of application No. PCT/CN2013/081216, filed on Aug. 9, 2013.

(51) Int. Cl.
*H04W 72/04* (2009.01)
*H04W 76/27* (2018.01)
(Continued)

(52) U.S. Cl.
CPC ....... *H04W 72/0453* (2013.01); *H04L 5/0003* (2013.01); *H04L 43/16* (2013.01); *H04W 76/27* (2018.02)

(58) Field of Classification Search
CPC ........... H04W 72/0453; H04W 76/046; H04W 76/04; H04W 72/04; H04W 4/06;
(Continued)

(56) References Cited

U.S. PATENT DOCUMENTS

2012/0188886 A1* 7/2012 Chen ............... H04L 5/001
                                                              370/252
2012/0213130 A1   8/2012 Zhang et al.
(Continued)

FOREIGN PATENT DOCUMENTS

CN    101404539 A    4/2009
CN    101753507 A    6/2010
(Continued)

OTHER PUBLICATIONS

NTT DOCOMO: "On the Need for Additional Carrier Types in Rel-11 CA," 3GPP TSG RAN WG1 Meeting #66bis, R1-113289, Oct. 10-14, 2011, 4 pages, Zhuhai, China.
(Continued)

*Primary Examiner* — Hardikkumar D Patel
(74) *Attorney, Agent, or Firm* — Slater Matsil, LLP

(57) ABSTRACT

A carrier configuration method is disclosed. According to various embodiments, the method includes configuring a new carrier type NCT subframe and/or a backward compatible subframe on a first carrier, determining subframe configuration information of the first carrier according to the configuration of the NCT subframe and/or the configuration of the backward compatible subframe on the first carrier and sending the subframe configuration information of the first carrier to first user equipment (UE) by using dynamic signaling, where the subframe configuration information of the first carrier is used by the first UE to determine a subframe type of a subframe on the first carrier according to the subframe configuration information of the first carrier. The method further includes using, according to the subframe type of the subframe on the first carrier, the first carrier to perform communication.

16 Claims, 4 Drawing Sheets

A base station configures an NCT subframe and/or a backward compatible subframe on a first carrier, and determines subframe configuration information of the first carrier according to the configuration of the NCT subframe and/or the configuration of the backward compatible subframe on the first carrier  — 101

The base station sends the subframe configuration information of the first carrier to a first UE by using dynamic signaling, where the subframe configuration information of the first carrier is used by the first UE to determine a subframe type of a subframe on the first carrier according to the subframe configuration information of the first carrier, and the subframe type of the subframe on the first carrier includes an NCT subframe and/or a backward compatible subframe; and uses, according to the subframe type of the subframe on the first carrier, the first carrier to perform communication  — 102

(51) Int. Cl.
   *H04L 12/26* (2006.01)
   *H04L 5/00* (2006.01)
(58) Field of Classification Search
   CPC ........... H04W 72/042; H04W 72/0446; H04W
         48/18; H04W 56/0015; H04W 76/048;
         H04W 72/005; H04L 5/00; H04L 43/16;
         H04L 5/005; H04L 5/0048; H04L
         27/2613; H04L 5/0051; H04L 27/2649;
         H04L 5/0053; H04L 5/0092; H04L
         5/0094; H04L 1/0046; H04L 1/0072;
         H04L 5/1469; H04L 5/14; H04L 1/1854;
         H04L 5/0055; H04L 5/0073; H04L 5/006;
         H04L 5/0028; H04L 5/0096; H04L 27/26;
         H04H 20/71; H04J 11/003; H04J
         11/0069; H04J 11/0073; H04J 11/0076;
         H04J 3/06; H04J 11/05; H04J 11/079;
         H04J 11/0086; H04J 13/18
   See application file for complete search history.

(56) References Cited

U.S. PATENT DOCUMENTS

2013/0301566 A1* 11/2013 Wei .................... H04W 72/048
                                                            370/329
   2014/0334457 A1* 11/2014 Tiirola ................. H04L 5/0096
                                                            370/336
   2015/0055584 A1* 2/2015 Lee .................... H04W 72/042
                                                            370/329
   2015/0098384 A1* 4/2015 Deng .................. H04L 5/0053
                                                            370/312

FOREIGN PATENT DOCUMENTS

CN         103220249 A      7/2013
   JP         2013042339 A     2/2013

OTHER PUBLICATIONS

Texas Instruments: "MBMS Reception on the NCT," 3GPP TSG RAN WG1 #73, R1-131940, May 20-24, 2013, 2 pages, Fukuoka, Japan.
Ericsson et al.: "Dynamic TDD on NCT," 3GPP TSG-RAN WG1 #73, R1-132014, May 20-24, 2013, 2pages, Fukuoka, Japan.
Nokia Siemens Networks et al.: "On Stand-Alone NCT and TDD," 3GPP TSG-RAN WG1 Meeting #73, R1-132289, May 20-24, 2013, 4 pages, Fukuoka, Japan.
Renesas Mobile Europe Ltd., "On DL Control and Reference Signal for New Carrier Type in LTE Re-11 CA" 3GPP TSG-RAN WG1 Meeting #67, Discussion, R1-113889, Nov. 14-18, 2011, San Francisco, CA., 4 pages.
New Postcom, "Discussion on different signalling mechanisms for TDD UL-DL reconfiguration" 3GPP TSG RAN WG1 Meeting #72, Discussion and Decision, R1-130163, Jan. 28-Feb. 1, 2013, St Julians, Malta, 5 pages.

* cited by examiner

CARRIER CONFIGURATION METHOD, BASE STATION, AND USER EQUIPMENT

This application is a continuation of International Patent Application No. PCT/CN2013/081216, filed on Aug. 9, 2013, which is incorporated herein by reference in its entirety.

TECHNICAL FIELD

The present invention relates to the communications field, and in particular, to a carrier configuration method, a base station, and user equipment.

BACKGROUND

In releases 8 to 11 of an LTE (Long Term Evolution) system, a PDCCH (physical downlink control channel) needs to be sent on at least one carrier, where the PDCCH is mainly used for scheduling uplink and downlink data transmission. A CRS (cell-specific reference signal) may be sent on the foregoing carrier, a CRS may be transmitted at least in a subframe within a time-frequency resource area of transmission control information, and a CRS may be transmitted in a time-frequency resource area of transmission control information on entire bandwidth. In addition, a CRS may be transmitted in a non-MBSFN (Multimedia Broadcast multicast service Single Frequency Network) subframe in a time-frequency resource area of transmission data information, and a CRS is also transmitted in a time-frequency resource area of transmission data information on entire bandwidth. The CRS may be used by a UE to demodulate a control channel and a data channel, so as to perform measurement of RRM (radio resource management) and CSI (channel state information), and perform time and frequency synchronization with a base station.

A CA (carrier aggregation) technology is introduced in LTE-A release 10. For a UE (user equipment) that supports a carrier aggregation capability, a base station may configure multiple carriers for the UE, and the multiple carriers may include one anchor carrier and multiple supplementary carriers, so that the UE simultaneously uses the multiple carriers to perform uplink and downlink communication, thereby supporting high-speed data transmission.

In LTE release 12 and a later release, a new carrier type is proposed, that is, an NCT (new carrier type). An NCT carrier may be a non-backward compatible carrier, and transmission of a cell-common reference signal, such as a CRS, in a subframe on the NCT carrier may be eliminated or reduced to improve carrier performance, for example, spectrum efficiency may be improved, heterogeneous network support may be improved, and energy saving is achieved. In a case in which transmission of a cell-common reference signal, such as a CRS, is reduced, transmission of some reserved cell-specific reference signals, such as CRSs, is mainly used by a UE to perform time and frequency tracking processing and referencing. This new carrier type may be used by, for example, a UE of the LTE release 12 and a UE of a release later than the LTE release 12.

Because the NCT carrier does not have backward compatibility, a UE of a release earlier than the LTE release 12 cannot use the NCT carrier. The UE of the release earlier than the LTE release 12 is referred to as a UE of an old release. The UE of an old release is a UE that cannot recognize an NCT carrier, and does not support performing communication by using an NCT carrier. To ensure that the UE of an old release communicates normally, for a cell in which the UE of an old release exists, an operator cannot deploy the NCT carrier, and cannot obtain a carrier performance gain caused by introduction of the NCT, which leads to relatively low carrier resource utilization in the cell.

SUMMARY

Embodiments of the present invention provide a carrier configuration method, a base station, and user equipment, which can resolve a problem in the prior art: for a cell in which a UE of an old release exists, an operator cannot deploy an NCT carrier, and cannot obtain a carrier performance gain caused by introduction of an NCT, which leads to relatively low carrier resource utilization in the cell.

According to a first aspect, an embodiment of the present invention provides a carrier configuration method, where the method includes configuring a new carrier type NCT subframe and/or a backward compatible subframe on a first carrier, determining subframe configuration information of the first carrier according to the configuration of the NCT subframe and/or the configuration of the backward compatible subframe on the first carrier, sending the subframe configuration information of the first carrier to first user equipment UE by using dynamic signaling, where the subframe configuration information of the first carrier is used by the first UE to determine a subframe type of a subframe on the first carrier according to the subframe configuration information of the first carrier, and the subframe type of the subframe on the first carrier includes an NCT subframe and/or a backward compatible subframe; and using, according to the subframe type of the subframe on the first carrier, the first carrier to perform communication.

With reference to the first aspect, in a first possible implementation manner, sending the subframe configuration information of the first carrier to first user equipment UE by using dynamic signaling includes periodically sending, according to a set sending period, the dynamic signaling to the first UE, where the dynamic signaling carries the subframe configuration information of the first carrier.

With reference to the first aspect or the first possible implementation manner of the first aspect, in a second possible implementation manner, the method further includes determining a service volume of at least one second UE and a subframe type supported by the at least one second UE that are in the first carrier and configuring an NCT subframe and/or a backward compatible subframe on a first carrier that includes configuring the NCT subframe and/or the backward compatible subframe on the first carrier according to the service volume of the second UE and the subframe type supported by the second UE.

With reference to the second possible implementation manner of the first aspect, in a third possible implementation manner, configuring the NCT subframe and/or the backward compatible subframe on the first carrier according to the service volume of the second UE and the subframe type supported by the second UE includes determining that a total service volume of a first type of UE served by the first carrier is less than a threshold T1, and configuring all subframes on the first carrier as NCT subframes, where the first type of UE is a UE that supports a backward compatible subframe, determining that a total service volume of a second type of UE served by the first carrier is less than a threshold T2, determining that a service volume of a first type of UE served by the first carrier is greater than a threshold T1, and configuring all subframes on the first carrier as backward compatible subframes, where the second type of UE is a UE that supports an NCT subframe, or determining that a total service volume of the first type of UE served by the first carrier is greater than or equal to a threshold T1, determining that a total service volume of the second type of UE served by the first carrier is greater than or equal to a threshold T2, and configuring both an NCT subframe and a backward compatible subframe on the first carrier.

With reference to the first aspect, or any possible implementation manner of the first possible implementation manner to the third possible implementation manner of the first aspect, in a fourth possible implementation manner, before the sending the subframe configuration information of the first carrier to first user equipment UE by using dynamic signaling, the method further includes sending semi-static signaling to the first UE, where the semi-static signaling is used to instruct the first UE to receive the dynamic signaling.

With reference to the fourth possible implementation manner of the first aspect, in a fifth possible implementation manner, sending semi-static signaling to the first UE includes adding the semi-static signaling to a master information block (MIB) or a system information block (SIB), and sending the semi-static signaling by using the MIB or the SIB or sending the semi-static signaling in a unicast form.

With reference to the first aspect, or any possible implementation manner of the first possible implementation manner to the fifth possible implementation manner of the first aspect, in a sixth possible implementation manner, the sending the subframe configuration information of the first carrier to a first user equipment UE by using dynamic signaling includes sending the dynamic signaling by using physical layer signaling, where the physical layer signaling is sent through a first physical layer channel.

With reference to the sixth possible implementation manner of the first aspect, in a seventh possible implementation manner, before sending the dynamic signaling by using physical layer signaling, the method further includes determining the first physical layer channel, where the first physical layer channel uses a same time-frequency resource as that of a physical control format indicator channel PCFICH.

With reference to the first possible implementation manner of the first aspect, in an eighth possible implementation manner, the method further includes transmitting a cell-common reference signal in a first subframe in the sending period, where the cell-common reference signal carried in the first subframe is used by the first UE to demodulate a first physical layer channel, and the first subframe carries the dynamic signaling.

With reference to the first aspect, or any possible implementation manner of the first possible implementation manner to the eighth possible implementation manner of the first aspect, in a ninth possible implementation manner, the subframe configuration information of the first carrier is one bit and the subframe configuration information is used to indicate one of the following subframe configuration cases: all subframes in a current sending period are NCT subframes and all subframes in the current sending period are backward compatible subframes.

With reference to the first aspect, or any possible implementation manner of the first possible implementation manner to the eighth possible implementation manner of the first aspect, in a tenth possible implementation manner, the subframe configuration information of the first carrier is two bits and the subframe configuration information is used to indicate one of the following subframe configuration cases all subframes in a current sending period are NCT subframes, all subframes in the current sending period are backward compatible subframes, in the current sending period, a subframe used to transmit a cell-common reference signal is the backward compatible subframe, and another subframe except the subframe used to transmit the cell-common reference signal is the NCT subframe, and a subframe in the current sending period is a subframe configured by using RRC signaling.

According to a second aspect, an embodiment of the present invention provides a carrier configuration method, where the method includes receiving dynamic signaling sent by a base station, where the dynamic signaling carries subframe configuration information of a first carrier, and the subframe configuration information of the first carrier is used to indicate configuration of an NCT subframe and/or the configuration of a backward compatible subframe on the first carrier, determining a subframe type of a subframe on the first carrier according to the subframe configuration information in the dynamic signaling, where the subframe type of the subframe on the first carrier includes an NCT subframe and/or a backward compatible subframe, and using, according to the subframe type of the subframe on the first carrier, the first carrier to perform communication.

With reference to the second aspect, in a first possible implementation manner, receiving dynamic signaling sent by a base station includes periodically receiving, according to a set sending period, the dynamic signaling sent by the base station.

With reference to the second aspect or the first possible implementation manner of the second aspect, in a second possible implementation manner, before receiving dynamic signaling sent by a base station, the method further includes receiving semi-static signaling sent by the base station, and determining, according to the semi-static signaling, to receive the dynamic signaling.

With reference to the second aspect, the first possible implementation manner of the second aspect, or the second possible implementation manner of the second aspect, in a third possible implementation manner, receiving dynamic signaling sent by a base station includes receiving, through a first physical layer channel, the dynamic signaling sent by the base station, where the dynamic signaling is sent by the base station by using physical layer signaling.

With reference to the third possible implementation manner of the second aspect, in a fourth possible implementation manner, the first physical layer channel uses a same time-frequency resource as that of a physical control format indicator channel PCFICH.

With reference to the first possible implementation manner of the second aspect, in a fifth possible implementation manner, before receiving dynamic signaling sent by a base station, the method includes determining a first subframe in the sending period, acquiring a cell-common reference signal from the first subframe, and demodulating a first physical layer channel according to the cell-common reference signal, where the first subframe is a subframe at a predefined location in each sending period of the first carrier, and the cell-common reference signal is transmitted in the first subframe.

With reference to the second aspect, or any possible implementation manner of the first possible implementation manner to the fifth possible implementation manner of the second aspect, in a sixth possible implementation manner, the subframe configuration information of the first carrier is one bit and the subframe configuration information is used to indicate one of the following subframe configuration cases: all subframes in a current sending period are NCT subframes and all subframes in the current sending period are backward compatible subframes.

With reference to the second aspect, or any possible implementation manner of the first possible implementation manner to the fifth possible implementation manner of the second aspect, in a seventh possible implementation manner, the subframe configuration information of the first carrier is two bits and the subframe configuration information is used to indicate one of the following subframe configuration cases: all subframes in a current sending period are NCT subframes, all subframes in the current sending period are backward compatible subframes, in the current sending period, a subframe used to transmit a cell-common reference signal is the backward compatible subframe, and another subframe except the subframe used to transmit the cell-common reference signal is the NCT subframe, and a subframe in the current sending period is a subframe configured by using RRC signaling.

According to a third aspect, an embodiment of the present invention provides a base station, where the base station includes a configuration module configured to configure a new carrier type NCT subframe and/or a backward compatible subframe on a first carrier, and determine subframe configuration information of the first carrier according to the configuration of the NCT subframe and/or the configuration of the backward compatible subframe on the first carrier, and a sending module configured to send, to first user equipment (UE) by using dynamic signaling, the subframe configuration information of the first carrier that is determined by the configuration module, where the subframe configuration information of the first carrier is used by the first UE to determine a subframe type of a subframe on the first carrier according to the subframe configuration information of the first carrier, and the subframe type of the subframe on the first carrier includes an NCT subframe and/or a backward compatible subframe, and to use, according to the subframe type of the subframe on the first carrier, the first carrier to perform communication.

With reference to the third aspect, in a first possible implementation manner, the sending module is specifically configured to periodically send, according to a set sending period, the dynamic signaling to the first UE, where the dynamic signaling carries the subframe configuration information of the first carrier.

With reference to the third aspect or the first possible implementation manner of the third aspect, in a second possible implementation manner, the base station further includes a determining module configured to determine a service volume of at least one second UE and a subframe type supported by the at least one second UE that are in the first carrier, where the configuration module is configured to configure the NCT subframe and/or the backward compatible subframe on the first carrier according to the service volume of the second UE and the subframe type supported by the second UE that are determined by the determining module.

With reference to the second possible implementation manner of the third aspect, in a third possible implementation manner, the configuration module is specifically configured to determine that a total service volume of a first type of UE served by the first carrier is less than a threshold T1, and configure all subframes on the first carrier as NCT subframes, where the first type of UE is a UE that supports a backward compatible subframe, to determine that a total service volume of a second type of UE served by the first carrier is less than a threshold T2, determine that a service volume of a first type of UE served by the first carrier is greater than a threshold T1, and configure all subframes on the first carrier as backward compatible subframes, where the second type of UE is a UE that supports an NCT subframe, or to determine that a total service volume of the first type of UE served by the first carrier is greater than or equal to a threshold T1, determine that a total service volume of the second type of UE served by the first carrier is greater than or equal to a threshold T2, and configure both an NCT subframe and a backward compatible subframe on the first carrier.

With reference to the third aspect, or any possible implementation manner of the first possible implementation manner to the third possible implementation manner of the third aspect, in a fourth possible implementation manner, the sending module is further configured to send semi-static signaling to the first UE before sending the dynamic signaling to the first UE, where the semi-static signaling is used to instruct the first UE to receive the dynamic signaling.

With reference to the fourth possible implementation manner of the third aspect, in a fifth possible implementation manner, the sending module is specifically configured to add the semi-static signaling to a master information block (MIB) or a system information block (SIB), and to send the semi-static signaling by using the MIB or the SIB or send the semi-static signaling in a unicast form.

With reference to the third aspect, or any possible implementation manner of the first possible implementation manner to the fifth possible implementation manner of the third aspect, in a sixth possible implementation manner, the sending module is specifically configured to send the dynamic signaling by using physical layer signaling, where the physical layer signaling is sent through a first physical layer channel.

With reference to the sixth possible implementation manner of the third aspect, in a seventh possible implementation manner, the determining module is further configured to determine the first physical layer channel, where the first physical layer channel uses a same time-frequency resource as that of a physical control format indicator channel PCFICH.

With reference to the first possible implementation manner of the third aspect, in an eighth possible implementation manner, the configuration module is further configured to transmit a cell-common reference signal in a first subframe in the sending period, where the cell-common reference signal carried in the first subframe is used by the first UE to demodulate a first physical layer channel, and the first subframe carries the dynamic signaling.

With reference to the third aspect, or any possible implementation manner of the first possible implementation manner to the eighth possible implementation manner of the third aspect, in a ninth possible implementation manner, the subframe configuration information of the first carrier that is configured by the configuration module is one bit and the subframe configuration information is used to indicate one of the following subframe configuration cases: all subframes in a current sending period are NCT subframes and all subframes in the current sending period are backward compatible subframes.

With reference to the third aspect, or any possible implementation manner of the first possible implementation manner to the eighth possible implementation manner of the third aspect, in a tenth possible implementation manner, the subframe configuration information of the first carrier that is configured by the configuration module is two bits and the subframe configuration information is used to indicate one of the following subframe configuration cases: all subframes in a current sending period are NCT subframes, all subframes in the current sending period are backward compatible subframes, in the current sending period, a subframe used to transmit a cell-common reference signal is the backward compatible subframe, and another subframe except the subframe used to transmit the cell-common reference signal is the NCT subframe, and a subframe in the current sending period is a subframe configured by using RRC signaling.

According to a fourth aspect, an embodiment of the present invention provides user equipment (UE), where the user equipment includes a receiving module configured to receive dynamic signaling sent by a base station, where the dynamic signaling carries subframe configuration information of a first carrier, and the subframe configuration information of the first carrier is used to indicate configuration of an NCT subframe and/or the configuration of a backward compatible subframe on the first carrier, a determining module configured to determine a subframe type of a subframe on the first carrier according to the subframe configuration information in the dynamic signaling received by the receiving module, where the subframe type of the subframe on the first carrier includes an NCT subframe and/or a backward compatible subframe, and a communication module configured to use, according to the subframe type that is of the subframe on the first carrier and that is determined by the determining module, the first carrier to perform communication.

With reference to the fourth aspect, in a first possible implementation manner, the receiving module is specifically configured to periodically receive, according to a set sending period, the dynamic signaling sent by the base station.

With reference to the fourth aspect or the first possible implementation manner of the fourth aspect, in a second possible implementation manner, the receiving module is further configured to receive semi-static signaling sent by the base station before the dynamic signaling sent by the base station is received and to determine, according to the semi-static signaling, to receive the dynamic signaling.

With reference to the fourth aspect, the first possible implementation manner of the fourth aspect, or the second possible implementation manner of the fourth aspect, in a third possible implementation manner, the receiving module is specifically configured to receive, through a first physical layer channel, the dynamic signaling sent by the base station, where the dynamic signaling is sent by the base station by using physical layer signaling, and the first physical layer channel uses a same time-frequency resource as that of a physical control format indicator channel PCFICH.

With reference to the fourth aspect, in a fourth possible implementation manner, the determining module is further configured to determine a first subframe in the sending period, to acquire a cell-common reference signal from the first subframe, and to demodulate a first physical layer channel according to the cell-common reference signal, where the first subframe is a subframe at a predefined location in each sending period of the first carrier, and the cell-common reference signal is transmitted in the first subframe.

With reference to the fourth aspect, or any possible implementation manner of the first possible implementation manner to the fourth possible implementation manner of the fourth aspect, in a fifth possible implementation manner, the subframe configuration information of the first carrier that is received by the receiving module is one bit and the subframe configuration information is used to indicate one of the following subframe configuration cases: all subframes in a current sending period are NCT subframes and all subframes in the current sending period are backward compatible subframes.

With reference to the fourth aspect, or any possible implementation manner of the first possible implementation manner to the fourth possible implementation manner of the fourth aspect, in a sixth possible implementation manner, the subframe configuration information of the first carrier that is received by the receiving module is two bits and the subframe configuration information is used to indicate one of the following subframe configuration cases: all subframes in a current sending period are NCT subframes, all subframes in the current sending period are backward compatible subframes, in the current sending period, a subframe used to transmit a cell-common reference signal is the backward compatible subframe, and another subframe except the subframe used to transmit the cell-common reference signal is the NCT subframe, and a subframe in the current sending period is a subframe configured by using RRC signaling.

According to a fifth aspect, an embodiment of the present invention provides a base station, where the base station includes a processor configured to configure a new carrier type NCT subframe and/or a backward compatible subframe on a first carrier, and determine subframe configuration information of the first carrier according to the configuration of the NCT subframe and/or the configuration of the backward compatible subframe on the first carrier and a transmitter configured to send, to first user equipment UE by using dynamic signaling, the subframe configuration information of the first carrier that is determined by the processor, where the subframe configuration information of the first carrier is used by the first UE to determine a subframe type of a subframe on the first carrier according to the subframe configuration information of the first carrier, and the subframe type of the subframe on the first carrier includes an NCT subframe and/or a backward compatible subframe, and to use, according to the subframe type of the subframe on the first carrier, the first carrier to perform communication.

According to the fifth aspect, in a possible implementation manner, the subframe type of the subframe on the first carrier includes an NCT subframe and/or a backward compatible subframe.

According to a sixth aspect, an embodiment of the present invention provides user equipment UE, where the user equipment includes a receiver configured to receive dynamic signaling sent by a base station, where the dynamic signaling carries subframe configuration information of a first carrier, and the subframe configuration information of the first carrier is used to indicate configuration of an NCT subframe and/or the configuration of a backward compatible subframe on the first carrier and a processor configured to determine a subframe type of a subframe on the first carrier according to the subframe configuration information in the dynamic signaling received by the receiver, where the subframe type of the subframe on the first carrier includes an NCT subframe and/or a backward compatible subframe; and use, according to the subframe type of the subframe on the first carrier, the first carrier to perform communication.

According to the carrier configuration method, the base station, and the user equipment provided in the embodiments of the present invention, an NCT subframe and a backward compatible subframe are configured on a first carrier, and subframe configuration information of the first carrier is sent to a UE, so that the UE determines a subframe type of a subframe on the first carrier. Therefore, compatibility of the first carrier with a UE of an old release and a UE of a new release is ensured, and both the UE of a new release and the UE of an old release can use the first carrier to perform communication. By using the method provided in the present invention, an operator can deploy, in a cell in which a UE of an old release exists, an NCT subframe for a UE in the cell to perform communication, so that a carrier performance gain caused by introduction of an NCT can be obtained, carrier resource utilization in the cell can be improved, and deployment of an NCT carrier in an evolution process of LTE is also facilitated.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiment(s) of the present invention, UEs of LTE release 12 and a release later than the LTE release 12 are referred to as UEs of a new release, and the UEs of a new release are UEs that can recognize an NCT carrier and support performing communication by using an NCT carrier.

In the embodiment(s) of the present invention, a UE of a release earlier than the LTE release 12 is referred to as a UE of an old release, and the UE of an old release is a UE that cannot recognize an NCT carrier, and does not support performing communication by using an NCT carrier.

In the embodiment(s) of the present invention, a new carrier type NCT subframe may be a subframe that can be supported or used by a UE that supports an NCT carrier, or a new carrier type NCT subframe may be a subframe that can be supported or used by UEs of the LTE release 12 and a release later than the LTE release 12.

In the embodiment(s) of the present invention, a backward compatible subframe may be a subframe that can be supported or used by both a UE that supports an NCT carrier and a UE that does not support an NCT carrier; or a backward compatible subframe may be a subframe that can be supported and used by UEs of all LTE releases; or a backward compatible subframe may be a subframe that is supported and used by all UEs of a release earlier than the LTE release 12, of the LTE release 12, and of a release later than the LTE release 12.

Embodiment 1

Figure 1:
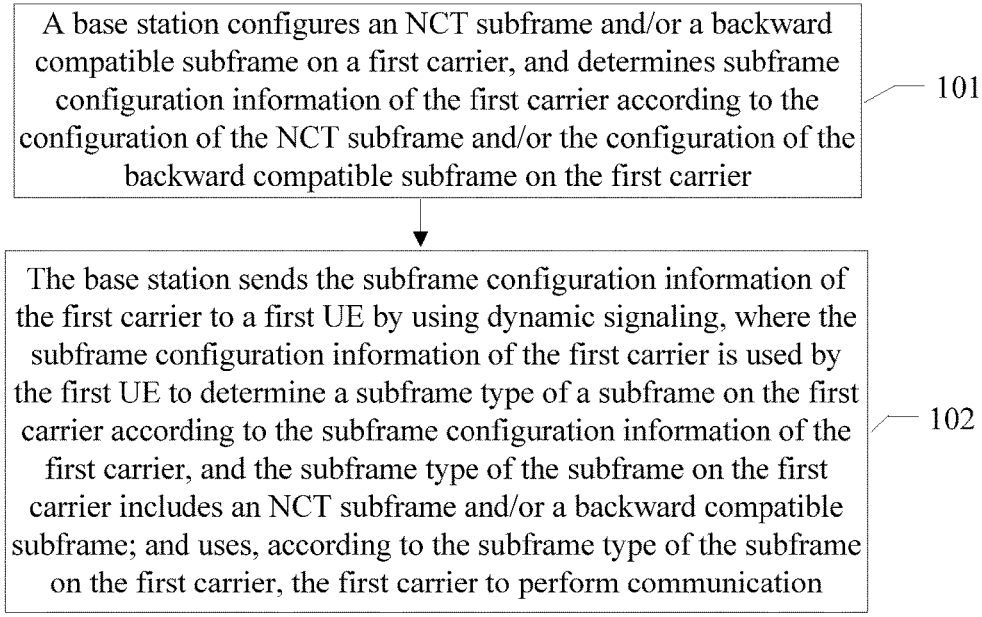
FIG. 1 is a schematic flowchart of a carrier configuration method according to Embodiment 1 of the present invention.

This embodiment of the present invention provides a carrier configuration method that can be implemented by a base station or a function module configured in a base station. This embodiment is described by using an example in which the method is implemented by the base station. As shown in FIG. 1, the method includes the following steps:

101. The base station configures an NCT subframe and/or a backward compatible subframe on a first carrier, and determines subframe configuration information of the first carrier according to the configuration of the NCT subframe and/or the configuration of the backward compatible subframe on the first carrier.

It should be noted that the method provided in this embodiment may be applicable to an LTE system (may be denoted as an LTE system of a new release), such as an LTE system of LTE release 12 or a release later than the LTE release 12, that supports an NCT characteristic. The first carrier is a special NCT carrier, and the special NCT carrier is a new carrier type obtained after an NCT carrier proposed in the LTE release 12 is optimized, that is, the special NCT carrier may be a new carrier type evolving from an NCT carrier.

For ease of understanding, the NCT carrier and the special NCT carrier are described as follows:

Each subframe on the NCT carrier is an NCT subframe; only some NCT subframes in all the NCT subframes carry a cell-common reference signal, such as a CRS (for example, if a sending period of the cell-common reference signal is 5 ms, for an NCT carrier, only one NCT subframe in every 5 ms carries a CRS), where the cell-common reference signal is mainly used by a UE to perform time and frequency tracking with a network. It should be noted that the NCT carrier does not support a UE of an old release (the UE of an old release in this embodiment refers to a UE that does not support an NCT characteristic), that is, the UE of an old release cannot use the NCT carrier to communicate with a network.

Both an NCT subframe and a backward compatible subframe are configured on the special NCT carrier provided in this embodiment; a manner for transmitting a cell-common reference signal in the NCT subframe is the same as a manner for transmitting a cell-common reference signal on the NCT carrier, and the cell-common reference signal is mainly used by a UE to perform time and frequency tracking with a network. However, for the backward compatible subframe, each backward compatible subframe carries a CRS, and the backward compatible subframe supports a UE of an old release. The UE of an old release can recognize the backward compatible subframe and use the backward compatible subframe to communicate with a network. In this way, this special NCT carrier may support the UE of an old release to some extent. For example, an example in which a sending period of a subframe is configured to be 5 ms is used for description, and a special NCT carrier includes an NCT subframe and/or a backward compatible subframe in one sending period. When all subframes of the special NCT carrier in the sending period of 5 ms are NCT subframes, only an NCT subframe at a location predefined by a system carries a cell-common reference signal (such as a CRS), and in this way, a UE of a new release can perform time and frequency tracking with a network according to the cell-common reference signal, and communicate with the network by using the NCT subframe. When all subframes of the special NCT carrier in the sending period of 5 ms are backward compatible subframes, all the backward compatible subframes carry cell-common reference signals, and in this case, both the UE of a new release and the UE of an old release can perform time and frequency tracking with a network according to the cell-common reference signals, and communicate with the network by using the backward compatible subframes. When the special NCT carrier has both an NCT subframe and a backward compatible subframe in the sending period of 5 ms, there is at least one NCT subframe in which transmission of a cell-common reference signal is different from that of a cell-common reference signal in another backward compatible subframe (for example, there may be an NCT subframe in which no cell-common reference signal is transmitted); in this case, the UE of a new release may communicate with a network by using the NCT subframe, and the UE of an old release may communicate with the network by using the backward compatible subframe.

It should be noted that, in this application, the cell-common reference signal may be a CRS, or may be another signal, for example, another reference signal sent in a cell-specific form, such as a CSI-RS (Channel State Information-Reference Signal, channel state information-reference signal).

102. The base station sends the subframe configuration information of the first carrier to a first UE by using dynamic signaling, where the subframe configuration information of the first carrier is used by the first UE to determine a subframe type of a subframe on the first carrier according to the subframe configuration information of the first carrier, and the foregoing subframe type includes a new carrier type NCT subframe and/or a backward compatible subframe; and uses, according to the subframe type of the subframe on the first carrier, the first carrier to perform communication.

It should be noted that, because the UE of an old release cannot recognize and use the NCT subframe, the first UE in step 102 is preferably the UE of a new release. The base station may send the subframe configuration information to the UE of a new release, that is, a UE of the LTE release 12 and a UE of a release later than the LTE release 12, because the UE of the LTE release 12 and the UE of a release later than the LTE release 12 not only can support and use the backward compatible subframe, but also can support the NCT subframe, and have a capability of recognizing and using the NCT subframe. Specifically, the base station notifies, by using the subframe configuration information, the UE of a new release of a subframe type of each subframe on the first carrier, so that the UE of a new release determines the type of each subframe on the first carrier according to the subframe configuration information, and determines content and a manner of signal transmission in each subframe, and further, the UE of a new release performs communication and data transmission with the base station in each subframe.

In addition, for UEs of an old release that are UEs of LTE release 10 and LTE release 11 that can support at least carrier aggregation, the base station may configure the special NCT carrier for the UEs of an old release at least in a supplementary carrier form, and activate the UEs of an old release to use the special NCT carrier. Further, the base station may configure the special NCT carrier, even in an anchor carrier form, for these UEs of an old release that support carrier aggregation; in this case, a signal and a common control channel that are necessary for the UEs of an old release need to be transmitted on this special NCT carrier in a time period during which these UEs of an old release use the special NCT carrier as an anchor carrier, and by means of scheduling performed by the base station, the UEs of an old release work in a backward compatible subframe, so that the UEs of an old release can use the backward compatible subframe of the first carrier to normally communicate with the base station. For other UEs of an old release, such as single-carrier UEs of LTE release 8 and LTE release 9, and UEs of LTE release 10 and LTE release 11 that cannot support carrier aggregation, the base station may configure the special NCT carrier for these UEs of an old release in a switchover manner by using the special NCT carrier as a target carrier; in this case, a signal and a common control channel that are necessary for the UEs of an old release need to be transmitted on this special NCT carrier in a time period during which these UEs of an old release work, and by means of scheduling performed by the base station, the UEs of an old release work in a backward compatible subframe of this special NCT carrier, so that the UEs of an old release may use the backward compatible subframe of the first carrier to normally communicate with the base station. In conclusion, the special NCT carrier may provide a service for the UEs of an old release to some extent. For a cell in which a UE of an old release exists, an operator can still deploy this type of special NCT carrier, which improves a carrier performance gain caused by introduction of an NCT, reduces interference and load caused by a common reference signal, and improves carrier resource efficiency and spectrum utilization in the cell.

In addition, for the UEs of LTE release 10 and LTE release 11 that can support at least carrier aggregation (for ease of description, the UEs may be referred to as UEs of an old release), the base station may configure the special NCT carrier for the UEs of an old release in a supplementary carrier form, and activate the UEs of an old release to use the special NCT carrier, and by means of scheduling performed by the base station, the UEs of an old release work in a backward compatible subframe, so that the UEs of an old release can use the backward compatible subframe of the first carrier to normally communicate with the base station. In this way, the special NCT carrier may provide a service to the UEs of an old release to some extent. For a cell in which a UE of an old release exists, an operator can still deploy this type of special NCT carrier, which improves a carrier performance gain caused by introduction of an NCT, reduces interference and load caused by a common reference signal, and improves carrier resource efficiency and spectrum utilization in the cell.

It should be noted that, the UE of a new release, the UE of an old release, the LTE system of a new release, and an LTE system of an old release that are provided in this specification are all relative conceptions; the LTE system of a new release is a system that can support an NCT characteristic, and the corresponding LTE system of an old release refers to a system that cannot support an NCT characteristic; the UE of a new release is a UE that can support an NCT characteristic, and the corresponding UE of an old release refers to a UE that cannot support an NCT characteristic. In the currently discussed LTE release 12, an NCT characteristic is potentially introduced. Therefore, in this specification, that the LTE release 12 is used as a dividing line is described as an example. It is mainly defined that the LTE system of a new release is a system of the LTE release 12 that can support an NCT characteristic, and the corresponding LTE system of an old release refers to a system that is of LTE release 8/9/10/11, earlier than the LTE release 12, and that cannot support an NCT characteristic; the UE of a new release is a UE of the LTE release 12 that can support an NCT characteristic, and the corresponding UE of an old release refers to a UE of the release 8/9/10/11, earlier than the LTE release 12, that cannot support an NCT characteristic, which is not limited in this specification. The system of a new release and the UE of a new release may also be potentially a system and a UE that are of a release later than the LTE release 12, for example, release 13.

According to the carrier configuration method provided in this embodiment of the present invention, an NCT subframe and a backward compatible subframe are configured on a first carrier, and subframe configuration information of the first carrier is sent to a UE, so that the UE determines a subframe type of a subframe on the first carrier. Therefore, compatibility of the first carrier with a UE of an old release and a UE of a new release is ensured, and both the UE of a new release and the UE of an old release can use the first carrier to perform communication. By using the method provided in the present invention, an operator can deploy, in a cell in which a UE of an old release exists, an NCT subframe for a UE in the cell to perform communication, so that a carrier performance gain caused by introduction of an NCT can be obtained, carrier resource efficiency and spectrum utilization in the cell can be improved, and deployment of an NCT carrier in an evolution process of LTE is also facilitated.

Specifically, for the carrier configuration method shown in FIG. 1, in this embodiment, the sending a UE of the subframe configuration information of the first carrier by using dynamic signaling of step 102 may be implemented in the following manner: periodically sending, according to a set sending period, the dynamic signaling to the first UE, where the dynamic signaling carries the subframe configuration information of the first carrier. By using the dynamic signaling, matching service volumes of a UE of an old release and a UE of a new release in a cell may be performed in real time, and further, configuration of a subframe type is performed, and use of a system resource is optimized. Especially in a small cell scenario in a heterogeneous network in which a quantity of users is relatively small, dynamic configuration may be performed according to a UE type and a service volume, which can improve carrier resource efficiency and spectrum utilization in the cell, improve a carrier performance gain caused by introduction of an NCT, and reduce interference and load caused by a common reference signal.

Specifically, the sending period of the dynamic signaling used to carry the subframe configuration information may be considered according to the following factor: A most flexible manner is sending, in each subframe, the dynamic signaling that indicates a configuration status of a current subframe, that is, indicates whether the current subframe is an NCT subframe or a backward compatible subframe, so that the UE can accurately determine a subframe type of the current subframe in real time.

Optionally, the dynamic signaling may use N subframes as a sending period, where N is greater than 1. In this way, an excessive signaling overhead caused by transmission of the dynamic signaling can be reduced, and a reference signal used to demodulate the dynamic signaling can be relatively flexibly selected. Specifically, reference may be made to a subsequent description. In addition, by using this method, a UE may perform processing with reduced complexity because the UE does not need to demodulate each of the subframes.

Further, considering support for the UE of an old release, at least considering support for aperiodic CSI measurement, configuration is also preferably performed in a periodic manner. Because when the base station triggers the UE of an old release to perform aperiodic CSI measurement, the UE of an old release performs measurement in several future subframes, that is, several subframes that are after triggering signaling is received and before a CSI feedback is reported, all these corresponding subframes should be backward compatible subframes to ensure accuracy of reporting a CSI by the UE of an old release. In addition, in general, scheduling performed by the base station may be advanced to some extent; for example, the base station may schedule several subframes in advance, and may further determine a type of a subframe in this period in advance, but also avoid excessive constraint on scheduling performed by the base station, and can feed back a current service requirement in time, where this period cannot be excessively long.

Optionally, before step 101, the carrier configuration method provided in this embodiment further includes the following step:

100. Determine a service volume of at least one second UE and a subframe type supported by the at least one second UE that are in the first carrier.

Based on step 100, step 101 specifically includes the following implementation manner: configuring the NCT subframe and/or the backward compatible subframe on the first carrier according to the service volume of the second UE and the subframe type supported by the second UE.

Specifically, based on step 100, step 101 specifically includes: determining that a total service volume of a first type of UE served by the first carrier is less than a threshold T1, and configuring all subframes on the first carrier as NCT subframes, where the first type of UE is a UE that supports a backward compatible subframe, determining that a total service volume of a second type of UE served by the first carrier is less than a threshold T2, determining that a service volume of a first type of UE served by the first carrier is greater than a threshold T1, and configuring all subframes on the first carrier as backward compatible subframes, where the second type of UE is a UE that supports an NCT subframe or determining that a total service volume of the first type of UE served by the first carrier is greater than or equal to a threshold T1, determining that a total service volume of the second type of UE served by the first carrier is greater than or equal to a threshold T2, and configuring both an NCT subframe and a backward compatible subframe on the first carrier.

Before step 102, the method further includes: sending semi-static signaling to the first UE, where the semi-static signaling is used to instruct the first UE to receive the dynamic signaling.

The sending semi-static signaling to the first UE includes: adding the semi-static signaling to a MIB (Master Information Block) or a SIB (System Information Block), and sending the semi-static signaling by using the MIB or the SIB or sending the semi-static signaling in a unicast form.

In step 102, the sending the subframe configuration information of the first carrier to a first UE by using dynamic signaling includes: sending the dynamic signaling by using physical layer signaling, where the physical layer signaling is sent through a first physical layer channel.

Before the sending the dynamic signaling by using physical layer signaling, the method further includes: determining the first physical layer channel, where the first physical layer channel uses a same time-frequency resource as that of a PCFICH (Physical Control Format Indicator Channel).

It should be noted that, the foregoing first UE is a UE of a new release, or the foregoing first UE is a UE that can support and/or use an NCT subframe.

It should be noted that, the second UE may include a UE that belongs to the first type of UE and/or a UE that belongs to the second type of UE, the first type of UE is a UE that supports a backward compatible subframe, and the second type of UE is a UE that supports an NCT subframe.

Specifically, the method provided in this embodiment further includes: transmitting a cell-common reference signal in a first subframe in the sending period, where the cell-common reference signal carried in the first subframe is used by the first UE to demodulate a first physical layer channel, the first subframe carries the dynamic signaling, and the first subframe is a subframe at a predefined location in each sending period of the first carrier.

It should be noted that, in this embodiment, the cell-common reference signal transmitted in the first subframe may be a CRS (Cell-specific Reference Signal), or may be a CSI-RS (Channel State Information-Reference Signal), or may be a cell-common reference signal in another predefined format, which is not limited in this embodiment.

As a specific implementation manner of this embodiment, the subframe configuration information of the first carrier is one bit and the subframe configuration information is used to indicate one of the following subframe configuration cases: all subframes in a current sending period are NCT subframes and all subframes in the current sending period are backward compatible subframes.

As another specific implementation manner of this embodiment, the subframe configuration information of the first carrier is two bits and the subframe configuration information is used to indicate one of the following subframe configuration cases: all subframes in a current sending period are NCT subframes, all subframes in the current sending period are backward compatible subframes, in the current sending period, a subframe used to transmit a cell-common reference signal is the backward compatible subframe, and another subframe except the subframe used to transmit the cell-common reference signal is the NCT subframe, and a subframe in the current sending period is a subframe configured by using RRC signaling.

Embodiment 2

Figure 2:
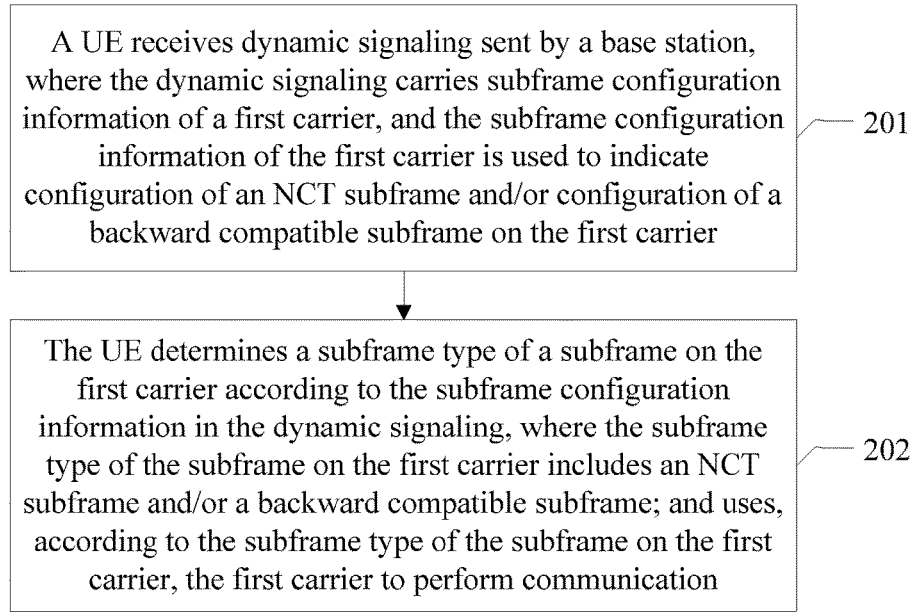
FIG. 2 is a schematic flowchart of a carrier configuration method according to Embodiment 2 of the present invention.

This embodiment provides a carrier configuration method that is applied to user equipment UE, and as shown in FIG. 2, the method includes the following steps:

201. The UE receives dynamic signaling sent by a base station, where the dynamic signaling carries subframe configuration information of a first carrier, and the subframe configuration information of the first carrier is used to indicate configuration of an NCT subframe and/or the configuration of a backward compatible subframe on the first carrier.

It should be noted that, the method provided in this embodiment may be applicable to a UE that supports an NCT characteristic. For ease of understanding, the UE that supports an NCT characteristic may be denoted as a UE of a new release, and the UE of a new release may be a UE that supports LTE release 12 or a release later than the LTE release 12.

For ease of distinguishing, a UE that does not support an NCT characteristic may be denoted as a UE of an old release, and the UE of an old release may be a UE that supports LTE release 11 and a release earlier than the LTE release 11. It should be noted that the UE of an old release and the UE of a new release are relative conceptions. Specifically, for details of the UE of an old release and the UE of a new release, reference may be made to the related description in Embodiment 1, which is not described herein again.

The first carrier is a new carrier type evolving from an NCT carrier and may be denoted as a special NCT carrier. Both an NCT subframe and a backward compatible subframe are configured on the first carrier, which is different from the NCT carrier. Specifically, for a difference between the special NCT carrier and the NCT carrier, reference may be made to the related description in Embodiment 1, which is not described herein again.

Specifically, step 201 may be implemented in the following specific manner: periodically receiving, by the UE according to a set sending period, the dynamic signaling sent by the base station.

202. The UE determines a subframe type of a subframe on the first carrier according to the subframe configuration information in the dynamic signaling, where the subframe type includes an NCT subframe and/or a backward compatible subframe; and uses, according to the subframe type of the subframe on the first carrier, the first carrier to perform communication.

Specifically, in this embodiment, the UE may determine the subframe type (including an NCT subframe and/or a backward compatible subframe) of the subframe on the first carrier according to the subframe configuration information in the dynamic signaling, and use, according to a subframe type of each subframe, the first carrier to perform communication.

It should be noted that, because CRS signals transmitted in an NCT subframe and a backward compatible subframe are different (for example, in a sending period, each backward compatible subframe carries a CRS, and in general, a CRS carried in a backward compatible subframe involves multiple CRS ports; however, generally, only one NCT subframe among multiple NCT subframes carries a CRS, and an NCT subframe that carries a CRS may involve only one CRS port). Therefore, after determining the subframe type of the subframe on the first carrier, the UE may determine, according to the subframe type of each subframe, a transmission status of a CRS signal in each subframe, and implement, according to the transmission status of the CRS signal in each subframe, processing of sending and receiving a signal.

It should be further noted that, physical downlink control channels PDCCHs may also be transmitted in different manners in an NCT subframe and a backward compatible subframe. In an NCT subframe, in general, a physical downlink control channel PDCCH is not transmitted. However, in one possible special case in which an MBSFN subframe or a PMCH subframe is also configured in the NCT subframe, a physical downlink control channel PDCCH is transmitted. In a backward compatible subframe, a physical downlink control channel PDCCH is transmitted in each subframe. In addition to signals and/or channels that are enumerated above, another signal and/or channel may be further included, and these signals and/or channels are transmitted in different manners in the two types of subframe: an NCT subframe and a backward compatible subframe, which may be all predefined. For example, for a DMRS, a pattern of the DMRS in an NCT subframe is different from a pattern of the DMRS in a backward compatible subframe, the NCT subframe and the backward compatible subframe are changed by using signaling; patterns of a DMRS are predefined according to different subframes, so that the patterns of the DMRS may be notified at the same time, which is applicable to another signal and channel, and details are not described one by one herein.

According to the carrier configuration method provided in this embodiment of the present invention, a subframe type of a subframe on a first carrier is determined by using received subframe configuration information, sent by a base station, of the first carrier, and the first carrier is used, according to a subframe type of each subframe, to perform communication. By using the method provided in the present invention, carrier resource utilization in a cell can be improved, and deployment of an NCT carrier in an evolution process of LTE is also facilitated.

With reference to the carrier configuration method shown in FIG. 2, in step 201, the receiving, by the UE, dynamic signaling sent by a base station includes: periodically receiving, by the UE according to a set sending period, the dynamic signaling sent by the base station.

Optionally, before step 201, the method further includes: receiving, by the UE, semi-static signaling sent by the base station, and determining, according to the semi-static signaling, to receive the dynamic signaling, adding the semi-static signaling to a master information block MIB or a system information block SIB, and sending the semi-static signaling by using the MIB or the SIB, or sending the semi-static signaling in a unicast form.

Specifically, in step 201, the receiving, by the UE, dynamic signaling sent by a base station includes: receiving, by the UE through a first physical layer channel, the dynamic signaling sent by the base station, where the dynamic signaling is sent by the base station by using physical layer signaling.

Optionally, the first physical layer channel uses a same time-frequency resource as that of a PCFICH.

Optionally, before step 201, the method further includes: determining, by the UE, a first subframe in the sending period, acquiring a cell-common reference signal from the first subframe, and demodulating a first physical layer channel according to the cell-common reference signal, where the first subframe is a subframe at a predefined location in each sending period of the first carrier, and the cell-common reference signal is transmitted in the first subframe.

As a specific implementation manner of this embodiment, the subframe configuration information of the first carrier is one bit and the subframe configuration information is used to indicate one of the following subframe configuration cases: all subframes in a current sending period are NCT subframes and all subframes in the current sending period are backward compatible subframes.

As another specific implementation manner of this embodiment, the subframe configuration information of the first carrier is two bits and the subframe configuration information is used to indicate one of the following subframe configuration cases: all subframes in a current sending period are NCT subframes, all subframes in the current sending period are backward compatible subframes, in the current sending period, a subframe used to transmit a cell-common reference signal is the backward compatible subframe, and another subframe except the subframe used to transmit the cell-common reference signal is the NCT subframe, and a subframe in the current sending period is a subframe configured by using RRC signaling.

Embodiment 3

Figure 3:
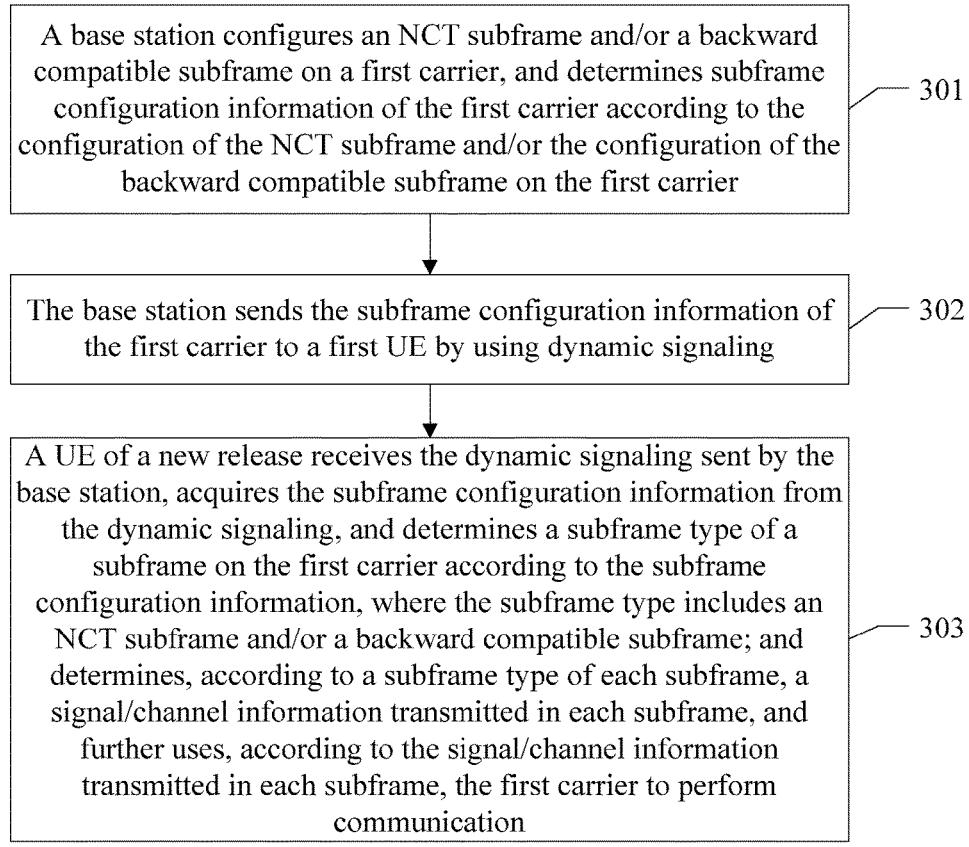
FIG. 3 is a schematic flowchart of a carrier configuration method according to Embodiment 3 of the present invention.

Based on the embodiments shown in FIG. 1 and FIG. 2, this embodiment provides a carrier configuration method, and as shown in FIG. 3, the method includes the following steps:

301. A base station configures an NCT subframe and/or a backward compatible subframe on a first carrier, and determines subframe configuration information of the first carrier according to the configuration of the NCT subframe and/or the configuration of the backward compatible subframe on the first carrier.

It should be noted that the first carrier in this embodiment is any one of multiple carriers that can be configured by the base station. Further, the first carrier may be a new carrier type evolving from an NCT carrier, and the carrier type may be denoted as a special NCT carrier. Specifically, for a definition of the special NCT carrier and a difference between the special NCT carrier and the NCT carrier, reference may be made to the related descriptions in Embodiment 1, which is not described herein again.

Optionally, before step 301, the method may further include the following steps S1 to S2:

S1. The base station determines a service volume of at least one second UE and a subframe type supported by the at least one second UE that are in the first carrier.

It should be noted that, a first UE is a UE of a new release, or a first UE is a UE that can support and/or use an NCT subframe.

It should be noted that, the second UE may include a UE that belongs to a first type of UE and/or a UE that belongs to a second type of UE, the first type of UE is a UE that supports a backward compatible subframe, and the second type of UE is a UE that supports an NCT subframe.

For ease of understanding, in this embodiment, UEs are classified into a UE of a new release (the second type of UE) and a UE of an old release (the first type of UE) according to whether the UE supports an NCT characteristic. For definitions of the UE of an old release and the UE of a new release, reference may be specifically made to the related description in Embodiment 1. Specifically, the UE of a new release supports an NCT characteristic, that is, the UE of a new release has a capability of recognizing and using an NCT subframe. The UE of an old release does not support an NCT characteristic, that is, the UE of an old release does not have a capability of recognizing or using an NCT subframe.

S2. The base station configures the NCT subframe and/or the backward compatible subframe on the first carrier according to the service volume of the second UE and the subframe type supported by the second UE.

Specifically, the foregoing step S2 may be implemented by using at least one of the following three methods:

(1) the base station determines that a total service volume of a first type of UE served by the first carrier is less than a threshold T1, and configures all subframes on the first carrier as NCT subframes, where the first type of UE is a UE that supports a backward compatible subframe;

(2) the base station determines that a total service volume of a second type of UE served by the first carrier is less than a threshold T2, determines that a service volume of a first type of UE served by the first carrier is greater than a threshold T1, and configures all subframes on the first carrier as backward compatible subframes, where the second type of UE is a UE that supports an NCT subframe; and (3) the base station determines that a total service volume of the first type of UE served by the first carrier is greater than or equal to a threshold T1, determines that a total service volume of the second type of UE served by the first carrier is greater than or equal to a threshold T2, and configures both an NCT subframe and a backward compatible subframe on the first carrier.

The method provided in this embodiment is applicable to a case in which a UE of an old release and a UE of a new release coexist in a cell. In addition, if all UEs in the cell are UEs of an old release, the base station may configure all carriers in the cell as backward compatible carriers; if all UEs in the cell are UEs of a new release, the base station may configure all carriers in the cell as NCT carriers to improve carrier resource utilization. It may be further considered that, even if a UE of an old release and a UE of a new release coexist in a cell, according to a service volume of the UE of an old release and a service volume of the UE of a new release in the cell, the base station may configure a type of each carrier by using the implemented method. Some carriers may be backward compatible carriers, and some carriers may be NCT carriers. However, this method is mainly applicable to a case in which the base station deploys multiple carriers, and cannot be implemented in a case in which only one carrier is deployed. Further, in this embodiment, when the service volume of the UE of an old release is greater than or equal to the threshold T1, and the service volume of the UE of a new release is greater than or equal to the threshold T2, at least one carrier may be configured as a special NCT carrier, and both a backward compatible subframe and an NCT subframe are included in this special NCT carrier.

For example, to ensure service quality of the UE of an old release in the cell, and improve carrier resource efficiency and spectrum utilization as much as possible, in this embodiment, at least one carrier may be configured as a special NCT carrier, and both a backward compatible subframe and an NCT subframe are included in this special NCT carrier. On this special NCT carrier, the service volume of the UE of an old release may be greater than or equal to the threshold T1 (T1 is a quantified service volume value greater than or equal to 0), and the service volume of the UE of a new release may be greater than or equal to the threshold T2 (T2 is a quantified service volume value greater than or equal to 0). Specifically, the base station may determine the configuration of the backward compatible subframe and the NCT subframe on the special NCT carrier according to values (including a proportion relationship between T1 and T2, a ratio of T1 to T2, or the like) of T1 and T2. Optionally, in a specific implementation process, values of T1 and T2 may be set according to a requirement of an operator for service quality of a UE and a requirement of the operator for carrier resource utilization, which is not specifically limited in this specification. Further, when more than one carrier is configured as a special NCT carrier, values of T1 and T2 on each carrier may be separately configured, and are specifically determined by using a base station algorithm, a requirement of the operator for using each carrier, or the like.

Further, if service load on a UE is relatively low, the base station may configure some carriers as NCT carriers, or may configure at least one carrier as a special NCT carrier and most subframes as NCT subframes. By using this method, because an NCT subframe needs to transmit only a relatively small quantity of common reference signals (in addition, transmission of control channels can be reduced), interference in an entire communications network can be reduced, and energy saving is also facilitated.

It should be noted that, steps S1 and S2 may be optional for the base station to implement the method.

302. The base station sends the subframe configuration information of the first carrier to a first UE by using dynamic signaling.

It should be noted that, the first UE is preferably the UE of a new release in this embodiment.

Specifically, by using the dynamic signaling, the base station may match service volumes of a UE of an old release and a UE of a new release in a cell in real time, and further performs configuration of a subframe type, where the subframe type includes an NCT subframe and/or a backward compatible subframe, thereby optimizing configuration and use of a system resource. Especially in a small cell scenario in a heterogeneous network in which a quantity of users is relatively small, dynamic configuration may be performed according to a UE type and a service volume, which can improve carrier resource efficiency and spectrum utilization in the cell, improve a carrier performance gain caused by introduction of an NCT, and reduce interference and load caused by a common reference signal.

In this embodiment, the base station may send each piece of subframe configuration information on the first carrier to the UE of a new release, because the UE of a new release can not only support and use a backward compatible subframe, but also support an NCT subframe, and has a capability of recognizing and using an NCT subframe. In addition, the base station configures a backward compatible subframe on the first carrier and schedules the backward compatible subframe on the first carrier to the UE of an old release, and may provide a service for the UE of an old release to some extent, to support the UE of an old release to communicate with a network by using the first carrier. Specifically, the base station notifies the UE of a new release of the subframe configuration information of the first carrier, so that the UE of a new release determines a type of each subframe according to the subframe configuration information, and further determines content and a manner of signal transmission in each subframe, which is convenient for the UE of a new release to perform communication and data transmission with the base station in the subframe on the first carrier.

By contrast, this carrier may be configured as an NCT carrier or a backward compatible subframe by using a semi-static method, which may be specifically determined according to a proportion of a UE of a new release to a UE of an old release and/or service volumes of the UE of a new release and the UE of an old release in a network, and/or the like. This semi-static configuration method may be performed in an implemented manner, the UE of a new release and the UE of an old release may learn a property of this carrier depending on detection and demodulation of a signal/channel by the UE of a new release and the UE of an old release, and further determines whether to access and use the carrier. However, it is relatively difficult for this semi-static configuration method to adapt to and match impact caused by a dynamic change in a quantity of terminals and a dynamic change in a terminal service. Especially in a case in which the quantity of terminals is relatively small, fluctuation in the terminal service is relatively apparent. In this case, load balance cannot be performed well and performance of a network deteriorates because the network cannot configure a new carrier type and a backward compatible carrier type to the full extent by using an optimal algorithm.

To overcome a problem in the semi-static carrier type method that services are not matched or better load balance cannot be achieved, in this embodiment, a method for notifying, by using dynamic signaling, a UE of configuration of a subframe on the first carrier is mainly used. The dynamic signaling can match service volumes of a UE of an old release and a UE of a new release in a cell more quickly to perform configuration of a subframe type. Especially in a small cell scenario in a heterogeneous network in which a quantity of users is relatively small, dynamic configuration may be performed according to a UE type and a service volume, which can improve carrier resource efficiency and spectrum utilization in the cell, improve a carrier performance gain caused by introduction of an NCT, and reduce interference and load caused by a common reference signal. Further, this method not only can flexibly achieve a balance between resource usage and load of the UE of an old release and the UE of a new release, but also can effectively support work and use of the UE of an old release in a new network and support flexible evolution and upgrade of a network.

Specifically, the base station may periodically send the dynamic signaling according to a set sending period. On a specific time-frequency resource, the base station periodically sends dynamic signaling, and the UE receives the dynamic signaling according to the set period. In this way, an implementation algorithm at a transmit end and a receive end may be simplified.

Specifically, the sending period of the dynamic signaling used to carry the subframe configuration information may be considered according to the following factor: A most flexible manner is sending, in each subframe, the dynamic signaling that indicates a configuration status of a current subframe, that is, indicates whether the current subframe is an NCT subframe or a backward compatible subframe, so that the UE can accurately determine a subframe type of the current subframe in real time.

Optionally, the dynamic signaling may use N subframes as a sending period, where N is greater than 1. In this way, an excessive signaling overhead caused by transmission of the dynamic signaling can be reduced, and a reference signal used to demodulate the dynamic signaling can be relatively flexibly selected. Specifically, reference may be made to a subsequent description. By using this method, a UE may further perform processing with reduced complexity because the UE does not need to demodulate each of the subframes.

Further, considering support for the UE of an old release, at least considering support for aperiodic CSI measurement, configuration is also preferably performed in a periodic manner. Because when the base station triggers the UE of an old release to perform aperiodic CSI measurement, the UE of an old release performs measurement in several future subframes, that is, several subframes that are after triggering signaling is received and before a CSI feedback is reported, all these corresponding subframes should be backward compatible subframes to ensure accuracy of reporting a CSI by the UE of an old release. In addition, in general, scheduling performed by the base station may be advanced to some extent; for example, the base station may schedule several subframes in advance, and may further determine a type of a subframe in this period in advance, but also avoid excessive constraint on scheduling performed by the base station, and can feed back a current service requirement in time, where this period cannot be excessively long.

Specifically, in this embodiment, the dynamic signaling may be sent by using physical layer signaling, the physical layer signaling is sent through a first physical layer channel, and a specified time-frequency resource and a specified codec transmission manner are pre-configured on the first physical layer channel. When the dynamic signaling is sent by using the physical layer signaling, step 302 is specifically: using, by the base station, the physical layer signaling to send the subframe configuration information of the first carrier to the UE of a new release through the first physical layer channel.

It should be noted that the dynamic signaling is sent by using the physical layer signaling, so that a subframe type of each subframe may be configured and changed in a carrier in a relatively dynamic and flexible manner, to quickly match a proportion of a UE of an old release and a UE of a new release and a change in services corresponding to the UE of an old release and the UE of a new release in a network, so that a network resource is effectively used. In addition, in a case in which service load on a network is relatively low, most subframes may be configured as NCT subframes. In this way, transmission of a common reference signal and a control channel that are reduced due to an NCT subframe functions significantly for effectively reducing interference in the entire network and saving energy for the network, and a communications system can obtain a system performance gain caused by an NCT carrier.

Further, the dynamic signaling mainly carries subframe configuration information, and a use status of each subframe is a cell-specific behavior. Therefore, sending, in a broadcast form by using a cell-specific channel, signaling that carries the subframe configuration information is a preferred solution. In this way, in the cell, all UEs that have a capability of parsing the signaling can acquire the subframe configuration information by using information carried in the signaling.

Preferably, the first physical layer channel may use a same time-frequency resource as that of a PCFICH (Physical Control Format Indicator Channel, physical control format indicator channel). In this way, multiplexing a cell-specific channel transmission mechanism on a PCFICH may be performed, and in this implementation manner, standard work can be simplified and performance can be ensured by means of multiplexing a control channel structure of an existing system. Because the UE of a new release has supported demodulation and decoding that are performed on the PCFICH, implementation of a UE is simplified. In addition, a data channel PDSCH of the UE may also be mapped by reusing an original method, that is, when the UE demodulates the PDSCH, rate matching of time-frequency resources occupied by the PCFICH needs to be considered. Therefore, the method provided in this embodiment is a method that can facilitate implementation on a UE side.

In this embodiment, the following may further be included: when the base station sends the dynamic signaling by using physical layer signaling, the base station may determine a predefined location in each sending period for the first carrier, determine a subframe at the location as the first subframe, and transmit a cell-common reference signal in the first subframe; the base station may send, in the first subframe, the dynamic signaling to the UE through the first physical layer channel, where the cell-common reference signal carried in the first subframe is used by the UE to demodulate the first physical layer channel.

The physical layer signaling in this embodiment is cell-specific signaling, so that all UEs in the cell that have a capability of parsing the signaling can acquire the subframe configuration information of the first carrier by using the signaling, and further communicate with the base station. The cell-specific signaling is sent through a cell-specific channel that also needs to be demodulated by using a cell-specific reference signal. Specifically, there are different methods for using the cell-specific reference signal, and there are different methods for determining the first subframe, that is, the physical layer signaling is transmitted in the first subframe, and is used to indicate the subframe configuration information on the first carrier, which are described in detail in the following by using examples separately.

In one method, the first physical layer channel is sent by being carried in a backward compatible subframe and is demodulated by using a current cell-common reference signal (such as a CRS), where the first subframe is a backward compatible subframe. In this case, the UE may use information about more than one CRS port to perform channel estimation and demodulation, and a quantity of CRS ports specifically depends on CRS configuration information of a cell in the backward compatible subframe.

Optionally, for the UE of an old release, the transmitted PCFICH may be used to indicate only a quantity of PDCCH symbols. By using this method, the UE of an old release may determine the quantity of physical downlink control channel PDCCH symbols to avoid confusion between signaling in the present invention that is intended for multiplexing a channel structure of the PCFICH but is then reused to indicate a subframe type of a new UE, and the original signaling.

Optionally, another method may be used. Cross-carrier scheduling is used for all UEs of an old release, and a PDCCH that schedules data transmission on one carrier may be carried on another carrier. In this way, the UE of an old release does not need to demodulate a PDCCH of the current carrier, and further does not need to demodulate a PCFICH that is designed by an LTE system of an old release to determine the quantity of PDCCH symbols. This method can reduce burden on the UE of an old release. For a UE of a new release, a current PCFICH not only carries information that indicates the quantity of PDCCH symbols, but also carries information that indicates subframe configuration.

Optionally, in another method, a physical layer channel at layer 1 is sent by being carried in an NCT subframe. Correspondingly, the first subframe is an NCT subframe, and in this case, a demodulation reference signal may be implemented in the following two selectable manners:

Manner 1: The NCT subframe still needs to carry cell-specific EPDCCH channels, and then these channels also need to be demodulated by using a cell-specific reference signal. In this way, the first physical layer channel may also be demodulated by multiplexing the reference signal. It should be noted that, in this case, a transmission issue of the physical layer channel at layer 1 needs to be considered, and there is a potential possibility that a time-frequency resource of a PCFICH designed by an original system is inappropriate for transmission. Because the cell-specific EPDCCHs are mainly transmitted on some frequency band resources, it may be considered that the transmission is performed in common search space of the control channel. However, specifically, the common search space of the control channel and the PCFICH of the original system may occupy different frequency-domain resources. Optionally, on one hand, there may be a limitation that the common search space of the control channel needs to include a frequency resource occupied by a quasi-PCFICH channel that carries subframe configuration information; on the other hand, there may be a limitation that the frequency resource occupied by the quasi-PCFICH channel that carries the subframe configuration information needs to be located in the common search space of the control channel. These two limitations exert an effect on transmission of the EPDCCHs and a resource unit that is actually occupied. In addition, a new method for mapping the quasi-PCFICH channel that carries the subframe configuration information potentially needs to be designed, or a limitation is potentially set on resource allocation of the common search space of the control channel.

Manner 2: For a demodulation reference signal for which the physical layer channel at layer 1 is chosen to perform transmission, in another embodiment, a cell-specific reference signal used for time and frequency tracking is used as a reference signal of a quasi-PCFICH channel that carries subframe configuration information. In an NCT subframe, a reference signal used for time and frequency tracking may also be a cell-specific reference signal and may be sent with occupation of relatively broad frequency band to ensure time and frequency tracking performance. Whether a CRS or a CSI-RS is specifically used as the reference signal used for time and frequency tracking, a difference lies only in patterns of these reference signals, and these reference signals are essentially cell-specific signals and sent in a specific time-frequency granularity, which may be simply described by using a cell-common reference signal CRS as an example. In a specific NCT, this CRS may be mainly used to perform time and frequency tracking, and may potentially reduce density of transmission. For example, only one CRS port is used and sending is performed once every five subframes. In this case, the quasi-PCFICH channel that carries the subframe configuration information may use this reference signal. To further improve performance of the quasi-PCFICH channel, there may be a difference between a quantity of transmitted bits and a quantity of bits used to indicate a quantity of PDCCH symbols on a PCFICH in a system of an old release. However, reducing the quantity of bits affects an indicated quantity of signaling. Therefore, flexibility and performance of the indicated subframe configuration information needs to be balanced. In addition, an advantage of this method is that a subframe used to transmit the quasi-PCFICH channel that carries the subframe configuration information may also be actually configured as a backward compatible subframe. The UE of a new release still performs demodulation as if the subframe was an NCT subframe, which exerts no effect on performance of this channel and imposes no constraint on configuration of this subframe, either. This subframe may be configured as an NCT subframe or may be configured as a backward compatible subframe, because a CRS transmitted in an NCT subframe is certainly a subset of a CRS transmitted in a backward compatible subframe. If flexibility of configuration of this subframe type is actually allowed, for the UE of a new release, a current PCFICH not only carries information that indicates the quantity of PDCCH symbols, but also carries information that indicates subframe configuration. Therefore, joint coding needs to be performed. However, the information that indicates the quantity of PDCCH symbols remains the same, each state may need to further indicate specific subframe configuration information. Further, for the UE of an old release, a transmitted PCFICH is used to indicate only the quantity of PDCCH symbols. Optionally, another method may be used. Cross-carrier scheduling is used for all the UEs of an old release, and a PDCCH that schedules data transmission on one carrier may be carried on another carrier. In this way, the UE of an old release does not need to demodulate a PDCCH of the current carrier, and further does not need to demodulate a PCFICH designed by a system of an old release to determine a quantity of PDCCH symbols. A UE of an old release that has a cross-carrier scheduling capability is required in this method. When the cross-carrier scheduling is used to resolve a problem of the UE of an old release, for the UE of a new release, a PCFICH channel transmitted in this subframe may indicate only subframe configuration information, and does not necessarily need to be multiplexed with information, in an LTE system of an old release, that is originally used to indicate the quantity of PDCCH symbols. It may be noted that, in this case, this subframe may be still supportively configured as an NCT subframe or a backward compatible subframe. System configuration is flexible, and this method is an exemplary method.

Optionally, the base station may determine a location of a first subframe in each sending period in a semi-static signaling manner. In this case, a physical layer channel at layer 1 may be sent by being carried in a backward compatible subframe or an NCT subframe. Specifically, it is jointly determined, according to the location, determined by the base station, of the first subframe in each sending period and a subframe type corresponding to the location of the first subframe carried in the physical layer signaling at layer 1, that the first subframe is a subframe used to transmit the physical layer channel at layer 1. Specifically, the first subframe may be configured by using semi-static signaling. A reference signal used to demodulate the physical layer channel at layer 1 may also be configured by using semi-static signaling, or it may be predefined, according to a subframe type of the first subframe, that a reference signal corresponding to the physical layer channel at layer 1 and used for demodulation is used.

Further, in this embodiment, the subframe configuration information of the first carrier is at least one bit, and the subframe configuration information is used to indicate any one of the following multiple subframe configuration cases: (a) all subframes in a current sending period are NCT subframes; (b) all subframes in the current sending period are backward compatible subframes; (c) in the current sending period, the first subframe is a backward compatible subframe, and another subframe except the first subframe is an NCT subframe; (d) in the current sending period, a subframe in which a cell-common reference signal is transmitted is a backward compatible subframe, and another subframe is an NCT subframe; (e) when not all subframes in the current sending period are NCT subframes or backward compatible subframes, subframe types of all subframes are predefined, where the subframe type includes an NCT subframe or a backward compatible subframe; and (f) a subframe in the current sending period is a subframe pre-configured by using RRC signaling.

Further, specifically, when the subframe configuration information of the first carrier is one bit, two types of state information can be carried to indicate the subframe configuration information of the first carrier. In one method, one state indicated by the one bit is used to indicate that all subframes in the current sending period are NCT subframes, and the other state is used to indicate that all subframes in the current sending period are backward compatible subframes. This case is relatively simple, a system only needs to predefine definitions of these two states and does not need extra signaling to assist in indication. When a great quantity of services of the UE of an old release or the UE of a new release in the system need to be transmitted, a same subframe type is collectively configured to complete data transmission as soon as possible.

In addition to the method mentioned above, furthermore, the two pieces of state information indicated by the one bit may be a combination of any two of the following six cases: (a) all subframes in a current sending period are NCT subframes; (b) all subframes in the current sending period are backward compatible subframes; (c) in the current sending period, the first subframe is a backward compatible subframe, and another subframe except the first subframe is an NCT subframe; (d) in the current sending period, a subframe in which a cell-common reference signal is transmitted is a backward compatible subframe, and another subframe is an NCT subframe; (e) when not all subframes in the current sending period are NCT subframes or backward compatible subframes, subframe types of all subframes are predefined, where the subframe type includes an NCT subframe or a backward compatible subframe; and (f) a subframe in the current sending period is a subframe pre-configured by using RRC signaling.

When the subframe configuration information is one bit, compared with a case in which a PCFICH channel in an LTE system of an old release transmits two bits of information to indicate a quantity of PDCCH symbols, because a quantity of bits of transmitted information is reduced, demodulation performance of the channel is improved, and fewer reference signals in an LTE system of an older release may be potentially used, which exerts an effect on channel estimation and demodulation performance. When these factors are comprehensively considered, transmitting the subframe configuration information in one bit is a preferred solution and performance may be ensured.

Optionally, to further carry more information, specifically, when the subframe configuration information of the first carrier is two bits, a maximum of four types of state information may be carried to indicate the subframe configuration information of the first carrier. For example, when the subframe configuration information is two bits, the subframe configuration information is used to indicate the following four cases: (a) all subframes in a current sending period are NCT subframes; (b) all subframes in the current sending period are backward compatible subframes; (c) in the current sending period, the first subframe is a backward compatible subframe, and another subframe except the first subframe is an NCT subframe; and (d) a subframe in the current sending period is a subframe pre-configured by using RRC signaling.

In addition to the method mentioned above, when the subframe configuration information of the first carrier is two bits, and subframe configuration information of the four states corresponding to the two bits is used to indicate any one of the following multiple subframe configuration cases: (a) all subframes in a current sending period are NCT subframes; (b) all subframes in the current sending period are backward compatible subframes; (c) in the current sending period, the first subframe is a backward compatible subframe, and another subframe except the first subframe is an NCT subframe; (d) in the current sending period, a subframe in which a cell-common reference signal is transmitted is a backward compatible subframe, and another subframe is an NCT subframe; (e) when not all subframes in the current sending period are NCT subframes or backward compatible subframes, subframe types of all subframes are predefined, where the subframe type includes an NCT subframe or a backward compatible subframe; and (f) a subframe in the current sending period is a subframe pre-configured by using RRC signaling.

For ease of understanding, this embodiment is further described by using an example in which the subframe configuration information of the first carrier is one bit or two bits, a sending period is the same as a period of a cell-common reference signal CRS used for performing time and frequency tracking and is 5 ms, and transmission is performed in a coding manner the same as that of a quasi-PCFICH channel in a system of an old release. Further, examples are used for description as follows:

(1) When the subframe configuration information of the first carrier is one bit, the subframe configuration information is preferably used to indicate the following two subframe configuration cases: (a) all subframes in a current sending period are NCT subframes; and (b) all subframes in the current sending period are backward compatible subframes.

Specifically, to ensure accuracy of transmitting the subframe configuration information, QPSK (Quadrature Phase Shift Keying, quadrature phase shift keying) may be used to perform modulation to map information of one bit to an element sequence of 32 bits, as shown in the following Table 1:

TABLE 1

| Configuration information state | Element sequence <$b_0, b_1, \ldots, b_{31}$> | Subframe configuration information |
|---|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> | NCT subframe [1, 1, 1, 1, 1] |
| 2 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> | Backward compatible subframe [0, 0, 0, 0, 0] |

A subframe type of a subframe on the first carrier may be represented by "0" and "1". In this embodiment, "0" represents a backward compatible subframe, and "1" represents an NCT subframe.

Specifically, as shown in Table 1:

configuration information state 1 represents that all subframes in a current sending period are NCT subframes; and configuration information state 2 represents that all subframes in the current sending period are backward compatible subframes.

It should be noted that, the foregoing Table 1 is described by using an example in which a sending period is 5 ms; therefore, each sending period includes five subframes. It should be emphasized that, the two types of subframe configuration cases shown in Table 1 are used only for example purposes, and this embodiment sets no limitation on a subframe configuration status in an actual application.

(2) When the subframe configuration information of the first carrier is two bits, the subframe configuration information is used to indicate the following four cases: (a) all subframes in a current sending period are NCT subframes; (b) all subframes in the current sending period are backward compatible subframes; (c) in the current sending period, the first subframe is a backward compatible subframe, and another subframe except the first subframe is an NCT subframe; and (d) a subframe in the current sending period is a subframe pre-configured by using RRC signaling.

Specifically, to ensure accuracy of transmitting the subframe configuration information, QPSK (Quadrature Phase Shift Keying, quadrature phase shift keying) may be used to perform modulation to map information of two bits to an element sequence of 32 bits, as shown in the following Table 2:

TABLE 2

| Configuration information state | Element sequence <$b_0, b_1, \ldots, b_{31}$> | Subframe configuration information |
|---|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> | NCT subframe [1, 1, 1, 1, 1] |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> | Backward compatible subframe [0, 0, 0, 0, 0] |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> | A first subframe is a backward compatible subframe, and another subframe except the first subframe is an NCT subframe |
| 4 | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> | RRC configuration |

A subframe type of a subframe on the first carrier may be represented by "0" and "1". In this embodiment, "0" represents a backward compatible subframe, and "1" represents an NCT subframe.

Specifically, as shown in Table 2:

configuration information state 1 represents that all subframes in a current sending period are NCT subframes;

configuration information state 2 represents that all subframes in the current sending period are backward compatible subframes;

configuration information state 3 represents that a first subframe is a backward compatible subframe, and that another subframe except the first subframe is an NCT subframe; and configuration information state 4 represents that subframe types of all subframes in the current sending period may be pre-configured by using RRC broadcast/unicast signaling.

It should be noted that, the foregoing Table 2 is described by using an example in which a sending period is 5 ms; therefore, each sending period includes five subframes. It should be emphasized that, the four types of subframe configuration cases shown in Table 2 are used only for example purposes, and this embodiment sets no limitation on a subframe configuration status in an actual application.

Further, optionally, before step 302, the method further includes the following optional steps: determining, by the base station, that the first carrier includes an NCT subframe and a backward compatible subframe, and sending semi-static signaling to the UE of a new release, where the semi-static signaling is used to indicate whether the UE of a new release receives, through the first physical layer channel, the dynamic signaling sent by the base station.

Specifically, the base station may add the semi-static signaling to a MIB (Master Information Block) or a SIB (System Information Block), and send the semi-static signaling to the UE of a new release in a broadcast form or the base station may send the semi-static signaling to the UE of a new release in a unicast form; for example, the base station may send the semi-static signaling to the UE of a new release by using dedicated RRC signaling.

Specifically, in this embodiment, the base station may determine, in a semi-static manner according to a change in quantities of UEs of a new release and UEs of an old release in a cell, whether both NCT subframes and backward compatible subframes are configured on the first carrier. For example, if all UEs in a cell are UEs of a new release, the base station may configure all carriers in the cell as NCT carriers; if all UEs in a cell are UEs of an old release, the base station may configure all carriers in the cell as backward compatible carriers; if a UE of a new release and a UE of an old release coexist in a cell, the base station may configure all or some carriers in the cell as the special NCT carriers.

Specifically, the base station may configure, by using semi-static signaling, whether a current carrier supports configuration of both an NCT subframe and a backward compatible subframe, which means that an NCT carrier and a special NCT carrier may be converted to each other and configured by using the semi-static signaling, and the dynamic signaling that carries subframe configuration information does not need to be transmitted and sent on an NCT carrier. If an NCT carrier is disabled to be a special NCT carrier, which means that this NCT carrier may not support a UE of an old release at all, that is, sending of the signaling and channel is disabled, which essentially implies that each subframe is an NCT subframe, no signaling is needed to perform notification, and a UE of a new release learns that the carrier is only a new carrier type. If an NCT carrier is enabled to be a special NCT carrier, specific information for configuring two subframe types, an NCT subframe and a backward compatible subframe, may be notified by using the method in the present invention. The dynamic signaling that carries subframe configuration information needs to be transmitted and sent on this special NCT carrier. A UE further enables, by parsing the signaling, a UE of a new release to learn each subframe type, and further determines a configuration status and a transmission status of a signal such as a CRS within a subframe, so that the UE of a new release performs, separately according to transmission of signals within different subframes, processing of sending and receiving the signal.

If a UE of a new release has received the semi-static signaling and enables an NCT carrier to be a special NCT carrier, the UE of a new release needs to monitor and receive the dynamic signaling through the first physical layer channel to determine configuration information of an NCT subframe and a backward compatible subframe on the special NCT carrier; if a UE of a new release has not received the semi-static signaling, or a UE of a new release has received the semi-static signaling and disables an NCT carrier to be a special NCT carrier, the UE of a new release considers by default that the base station does not transmit dynamic signaling used to carry configuration information of an NCT subframe and a backward compatible subframe. In addition, the base station may transmit normal PDSCH data or other content by using a first physical layer channel resource that can be originally used to carry dynamic signaling, and the UE and the base station have same understanding. For transmitting the normal PDSCH data or other content by using the first physical layer channel resource that can be originally used to carry the dynamic signaling, the UE of a new release may receive, from the first physical layer channel resource, data and other information sent by the base station, which is not limited herein, to ensure resource utilization efficiency.

303. A UE of a new release receives the dynamic signaling sent by the base station, acquires the subframe configuration information from the dynamic signaling, and determines a subframe type of a subframe on the first carrier according to the subframe configuration information, where the subframe type includes an NCT subframe and/or a backward compatible subframe; and determines, according to a subframe type of each subframe, a signal and/or channel information (such as CRS information) transmitted in each subframe, and further uses, according to the signal and/or channel information transmitted in each subframe, the first carrier to perform communication.

It should be noted that, because CRS signals transmitted in an NCT subframe and a backward compatible subframe are different, for example, a difference in a quantity of CRS ports, after determining the subframe type of the subframe on the first carrier, the UE may determine, according to the subframe type of each subframe, a transmission status of a CRS signal in each subframe, and implement, according to the transmission status of the CRS signal in each subframe, processing of sending and receiving the signal. Specifically, in each sending period, a CRS is transmitted in a first subframe, where the first subframe is a subframe at a specified location in each sending period. For example, when a CRS with a transmission period of 5 ms is used as a cell-specific reference signal, the first subframe of the first carrier may be determined in a manner in which a subframe with number M mod 5 is 0, that is, a subframe with number 0, a subframe with number 5, a subframe with number 10 . . . in the first carrier are set to first subframes in which CRS s are transmitted.

It should be further noted that, physical downlink control channels PDCCHs may also be transmitted in different manners in an NCT subframe and a backward compatible subframe. In an NCT subframe, in general, a physical downlink control channel PDCCH is not transmitted. However, in one possible special case in which an MBSFN subframe or a PMCH subframe is also configured in the NCT subframe, a physical downlink control channel PDCCH is transmitted. In a backward compatible subframe, a physical downlink control channel PDCCH is transmitted in each subframe. In addition to signals and/or channels that are enumerated above, another signal and/or channel may be further included, and these signals and/or channels are transmitted in different manners in the two types of subframe: an NCT subframe and a backward compatible subframe, which may be all predefined. For example, for a DMRS, a pattern of the DMRS in an NCT subframe is different from a pattern of the DMRS in a backward compatible subframe, the NCT subframe and the backward compatible subframe are changed by using signaling; patterns of a DMRS are predefined according to different subframes, so that the patterns of the DMRS may be notified at the same time, which is further applicable to another signal and channel, and details are not described one by one herein.

Preferably, to ensure that a first subframe in each sending period is matched with dynamic signaling, a sending period of the first physical layer channel is the same as the sending period of the first subframe, that is, in a sending timeslot of the first subframe, the dynamic signaling is sent to the UE through the first physical layer channel, and a cell-common reference signal in the first subframe is used to perform demodulation on the dynamic signaling.

It should be noted that, the foregoing steps 302 to 303 are applicable to the UE of a new release, and to allow the UE of an old release to use the first carrier, optionally, after step 301, the method further includes the following step:

304. The base station schedules a backward compatible subframe in the first carrier according to the subframe configuration information of the first carrier, and schedules some or all backward compatible subframes to the UE of an old release, so that the UE of an old release uses the backward compatible subframe scheduled by the base station to perform communication.

Preferably, in this embodiment, the base station configures the first carrier as a supplementary carrier to be used by the UE of an old release. Specifically, the UE of an old release may learn, according to semi-static signaling and without depending on detection on a PCFICH, a starting location for data transmission on the first carrier; after determining the starting location for data transmission on the first carrier, the UE of an old release may send data on the first carrier according to cross-carrier scheduling of an anchor carrier. Further, in this embodiment, the base station may configure the first carrier as an anchor carrier to be used by the UE of an old release. In this case, to ensure access and use of the UE of an old release, a common system message, such as a MIB and a SIB, needs to be transmitted on this carrier. In this case, a subframe that is predefined in LTE and that is used for transmitting a MIB or at least for transmitting SIB 1 should certainly maintain to be a backward compatible subframe, and another subframe may be an NCT subframe. Specifically, a subframe type of each subframe may further be determined according to signaling in the method in this embodiment.

Optionally, for an NCT subframe that carries a CRS, because the CRS carried in the NCT subframe may be a CRS obtained by reducing CRS density, for ease of determining CRS information of subframes (including a backward compatible subframe and the NCT subframe that carries the CRS) by a UE, the base station may notify the UE of CRS port configuration information of each subframe in the first carrier, so that the UE determines whether a CRS is transmitted in each subframe in the first carrier and determines the CRS port information in each subframe (generally, one/two/four CRS ports are configured in a backward compatible subframe; no CRS port or only one CRS port is configured in an NCT subframe). Specifically, the base station may send the CRS port configuration information in each subframe to the UE by using MIB signaling or SIB signaling. After acquiring the CRS port configuration information in each subframe, the UE may acquire a CRS from a subframe that is on the first carrier and in which the CRS is transmitted, perform demodulation and measurement on a channel (including at least a data channel and a control channel) according to the CRS, and synchronize with the base station.

According to the carrier configuration method provided in this embodiment of the present invention, a base station configures an NCT subframe and a backward compatible subframe on a first carrier, and sends subframe configuration information of the first carrier to a UE, so that the UE determines a subframe type of a subframe on the first carrier. Therefore, compatibility of the first carrier with a UE of an old release and a UE of a new release is ensured, and both the UE of a new release and the UE of an old release can use the first carrier to perform communication. By using the method provided in the present invention, an operator can deploy, in a cell in which a UE of an old release exists, an NCT subframe for a UE in the cell to perform communication, so that a carrier performance gain caused by introduction of an NCT can be obtained, carrier resource utilization in the cell can be improved, and deployment of an NCT carrier in an evolution process of LTE is also facilitated.

Embodiment 4

Figure 4:
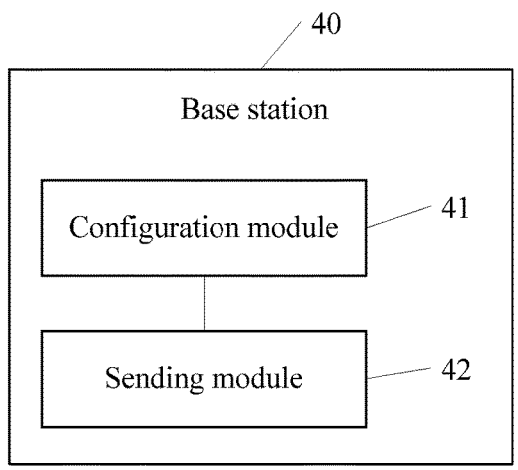
FIG. 4 and FIG. 5 are structural block diagrams of a base station according to Embodiment 4 of the present invention.

This embodiment provides a base station, which can implement the method of the base station in the embodiments shown in the foregoing FIG. 1 to FIG. 3. As shown in FIG. 4, a base station 40 provided in this embodiment includes a configuration module 41 configured to configure a new carrier type NCT subframe and/or a backward compatible subframe on a first carrier, and determine subframe configuration information of the first carrier according to the configuration of the NCT subframe and/or the configuration of the backward compatible subframe on the first carrier and a sending module 42 configured to send, to a first UE by using dynamic signaling, the subframe configuration information of the first carrier that is determined by the configuration module 41, where the subframe configuration information of the first carrier is used by the first UE to determine a subframe type of a subframe on the first carrier according to the subframe configuration information of the first carrier, and the subframe type of the subframe on the first carrier includes an NCT subframe and/or a backward compatible subframe and to use, according to the subframe type of the subframe on the first carrier, the first carrier to perform communication.

Specifically, the sending module 42 is configured to periodically send, according to a set sending period, the dynamic signaling to the first UE, where the dynamic signaling carries the subframe configuration information of the first carrier.

Figure 5:
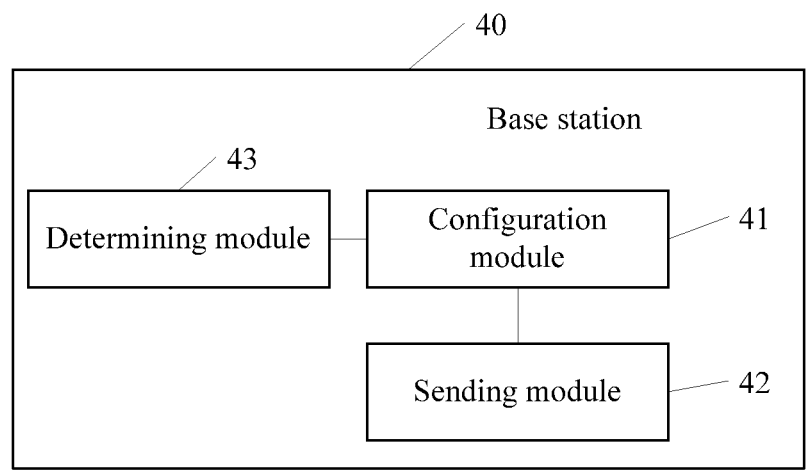

Further, as shown in FIG. 5, the base station 40 further includes a determining module 43 configured to determine a service volume of at least one second UE and a subframe type supported by the at least one second UE that are in the first carrier, where the configuration module 41 is configured to configure the NCT subframe and/or the backward compatible subframe on the first carrier according to the service volume of the second UE and the subframe type supported by the second UE that are determined by the determining module 43.

Specifically, the configuration module 41 is configured to determine that a total service volume of a first type of UE served by the first carrier is less than a threshold T1, and configure all subframes on the first carrier as NCT subframes, where the first type of UE is a UE that supports a backward compatible subframe, to determine that a total service volume of a second type of UE served by the first carrier is less than a threshold T2, determine that a service volume of a first type of UE served by the first carrier is greater than a threshold T1, and configure all subframes on the first carrier as backward compatible subframes, where the second type of UE is a UE that supports an NCT subframe, or to determine that a total service volume of the first type of UE served by the first carrier is greater than or equal to a threshold T1, determine that a total service volume of the second type of UE served by the first carrier is greater than or equal to a threshold T2, and configure both an NCT subframe and a backward compatible subframe on the first carrier.

Optionally, the sending module 42 is further configured to send semi-static signaling to the first UE, before the dynamic signaling to the first UE is sent, where the semi-static signaling is used to instruct the first UE to receive the dynamic signaling.

The sending module 42 is specifically configured to add the semi-static signaling to a MIB or a SIB, and send the semi-static signaling by using the MIB or the SIB, or to send the semi-static signaling in a unicast form.

The sending module 42 is specifically configured to send the dynamic signaling by using physical layer signaling, where the physical layer signaling is sent through a first physical layer channel. The determining module 43 is further configured to determine the first physical layer channel, where the first physical layer channel uses a same time-frequency resource as that of a physical control format indicator channel PCFICH.

The configuration module 41 is further configured to transmit a cell-common reference signal in a first subframe in the sending period, where the cell-common reference signal carried in the first subframe is used by the first UE to demodulate a first physical layer channel, and the first subframe carries the dynamic signaling.

In one possible specific implementation manner, the subframe configuration information of the first carrier that is configured by the configuration module 41 is one bit and the subframe configuration information is used to indicate one of the following subframe configuration cases: all subframes in a current sending period are NCT subframes and all subframes in the current sending period are backward compatible subframes.

In another possible specific implementation manner, the subframe configuration information of the first carrier that is configured by the configuration module 41 is two bits and the subframe configuration information is used to indicate one of the following subframe configuration cases: all subframes in a current sending period are NCT subframes, all subframes in the current sending period are backward compatible subframes, in the current sending period, a subframe used to transmit a cell-common reference signal is the backward compatible subframe, and another subframe except the subframe used to transmit the cell-common reference signal is the NCT subframe, and a subframe in the current sending period is a subframe configured by using RRC signaling.

It should be noted that, the foregoing first UE is a UE of a new release, or the foregoing first UE is a UE that can support and/or use an NCT subframe.

It should be noted that, the second UE may include a UE that belongs to the first type of UE and/or a UE that belongs to the second type of UE, the first type of UE is a UE that supports a backward compatible subframe, and the second type of UE is a UE that supports an NCT subframe.

According to the base station provided in this embodiment of the present invention, an NCT subframe and a backward compatible subframe are configured on a first carrier, and subframe configuration information of the first carrier is sent to a UE, so that the UE determines a subframe type of a subframe on the first carrier. Therefore, compatibility of the first carrier with a UE of an old release and a UE of a new release is ensured, and both the UE of a new release and the UE of an old release can use the first carrier to perform communication. By using the base station provided in the present invention, an operator can deploy, in a cell in which a UE of an old release exists, an NCT subframe for a UE in the cell to perform communication, so that a carrier performance gain caused by introduction of an NCT can be obtained, carrier resource efficiency and spectrum utilization in the cell can be improved, and deployment of an NCT carrier in an evolution process of LTE is also facilitated.

Embodiment 5

Figure 6:
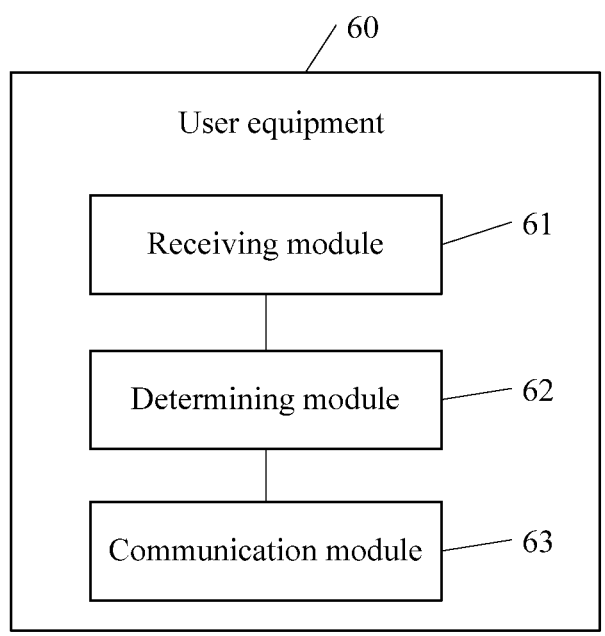
FIG. 6 is a structural block diagram of user equipment according to Embodiment 5 of the present invention.

This embodiment of the present invention provides user equipment UE, which can implement the method of the UE in the embodiments shown in FIG. 1 to FIG. 3. As shown in FIG. 6, user equipment 60 provided in this embodiment includes a receiving module 61 configured to receive dynamic signaling sent by a base station, where the dynamic signaling carries subframe configuration information of a first carrier, and the subframe configuration information of the first carrier is used to indicate configuration of an NCT subframe and/or the configuration of a backward compatible subframe on the first carrier, a determining module 62 configured to determine a subframe type of a subframe on the first carrier according to the subframe configuration information in the dynamic signaling received by the receiving module 61, where the subframe type of the subframe on the first carrier includes an NCT subframe and/or a backward compatible subframe and a communication module 63 configured to use, according to the subframe type that is of the subframe on the first carrier and that is determined by the determining module 62, the first carrier to perform communication.

The receiving module 61 is specifically configured to periodically receive, according to a set sending period, the dynamic signaling sent by the base station.

Optionally, the receiving module 61 is further configured to receive semi-static signaling sent by the base station, before the dynamic signaling sent by the base station is received, and to determine, according to the semi-static signaling, to receive the dynamic signaling.

The receiving module 61 is specifically configured to receive, through a first physical layer channel, the dynamic signaling sent by the base station, where the dynamic signaling is sent by the base station by using physical layer signaling, and the first physical layer channel uses a same time-frequency resource as that of a physical control format indicator channel PCFICH.

The determining module 62 is further configured to determine a first subframe in the sending period, acquire a cell-common reference signal from the first subframe, and demodulate a first physical layer channel according to the cell-common reference signal, where the first subframe is a subframe at a predefined location in each sending period of the first carrier, and the cell-common reference signal is transmitted in the first subframe.

In one possible specific implementation manner, the subframe configuration information of the first carrier that is received by the receiving module 61 is one bit and the subframe configuration information is used to indicate one of the following subframe configuration cases: all subframes in a current sending period are NCT subframes and all subframes in the current sending period are backward compatible subframes.

In another possible specific implementation manner, the subframe configuration information of the first carrier that is received by the receiving module 61 is two bits and the subframe configuration information is used to indicate one of the following subframe configuration cases: all subframes in a current sending period are NCT subframes, all subframes in the current sending period are backward compatible subframes, in the current sending period, a subframe used to transmit a cell-common reference signal is the backward compatible subframe, and another subframe except the subframe used to transmit the cell-common reference signal is the NCT subframe, and a subframe in the current sending period is a subframe configured by using RRC signaling.

According to the user equipment provided in this embodiment of the present invention, a subframe type of a subframe on a first carrier is determined by using subframe configuration information of the first carrier that is sent by a base station, so that compatibility of the first carrier with a UE of an old release and a UE of a new release can be ensured, and both the UE of a new release and the UE of an old release can use the first carrier to perform communication. By using the user equipment provided in the present invention, an operator can deploy, in a cell in which a UE of an old release exists, an NCT subframe for a UE in the cell to perform communication, so that a carrier performance gain caused by introduction of an NCT can be obtained, carrier resource efficiency and spectrum utilization in the cell can be improved, and deployment of an NCT carrier in an evolution process of LTE is also facilitated.

Embodiment 6

Figure 7:
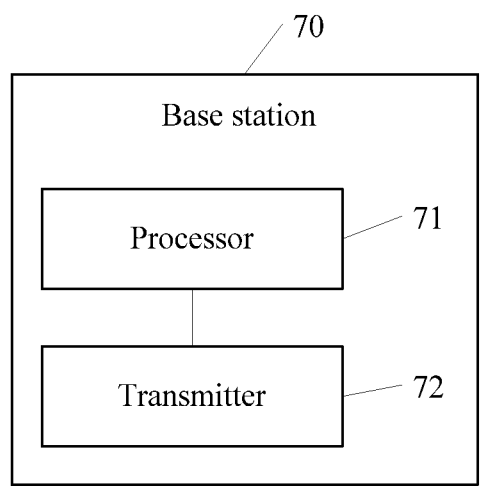
FIG. 7 is a structural block diagram of a base station according to Embodiment 6 of the present invention.

This embodiment provides a base station, which can implement the method of the base station in the embodiments shown in the foregoing FIG. 1 to FIG. 3. As shown in FIG. 7, a base station 70 provided in this embodiment includes a processor 71 configured to configure a new carrier type NCT subframe and/or a backward compatible subframe on a first carrier, and determine subframe configuration information of the first carrier according to the configuration of the NCT subframe and/or the configuration of the backward compatible subframe on the first carrier and a transmitter 72 configured to send, to first user equipment UE by using dynamic signaling, the subframe configuration information of the first carrier that is determined by the processor 71, where the subframe configuration information of the first carrier is used by the first UE to determine a subframe type of a subframe on the first carrier according to the subframe configuration information of the first carrier, and the subframe type of the subframe on the first carrier includes an NCT subframe and/or a backward compatible subframe, and to use, according to the subframe type of the subframe on the first carrier, the first carrier to perform communication.

Specifically, the transmitter 72 is configured to periodically send, according to a set sending period, the dynamic signaling to the first UE, where the dynamic signaling carries the subframe configuration information of the first carrier.

Further, the processor 71 is further configured to determine a service volume of at least one second UE and a subframe type supported by the at least one second UE that are in the first carrier, and configure the NCT subframe and/or the backward compatible subframe on the first carrier according to the service volume of the second UE and the subframe type supported by the second UE.

Specifically, the processor 71 is configured to determine that a total service volume of a first type of UE served by the first carrier is less than a threshold T1, and configure all subframes on the first carrier as NCT subframes, where the first type of UE is a UE that supports a backward compatible subframe, to determine that a total service volume of a second type of UE served by the first carrier is less than a threshold T2, determine that a service volume of a first type of UE served by the first carrier is greater than a threshold T1, and configure all subframes on the first carrier as backward compatible subframes, where the second type of UE is a UE that supports an NCT subframe, or to determine that a total service volume of the first type of UE served by the first carrier is greater than or equal to a threshold T1, determine that a total service volume of the second type of UE served by the first carrier is greater than or equal to a threshold T2, and configure both an NCT subframe and a backward compatible subframe on the first carrier.

Optionally, the transmitter 72 is further configured to send semi-static signaling to the first UE before the dynamic signaling to the first UE is sent, where the semi-static signaling is used to instruct the first UE to receive the dynamic signaling.

The transmitter 72 is specifically configured to add the semi-static signaling to a MIB or a SIB, and send the semi-static signaling by using the MIB or the SIB, or to send the semi-static signaling in a unicast form.

The transmitter 72 is specifically configured to send the dynamic signaling by using physical layer signaling, where the physical layer signaling is sent through a first physical layer channel. The processor 71 is further configured to determine the first physical layer channel, where the first physical layer channel uses a same time-frequency resource as that of a physical control format indicator channel PCFICH.

The processor 71 is further configured to transmit a cell-common reference signal in a first subframe in the sending period, where the cell-common reference signal carried in the first subframe is used by the first UE to demodulate a first physical layer channel, and the first subframe carries the dynamic signaling.

In one possible specific implementation manner, the subframe configuration information of the first carrier that is determined by the processor 71 is one bit and the subframe configuration information is used to indicate one of the following subframe configuration cases: all subframes in a current sending period are NCT subframes and all subframes in the current sending period are backward compatible subframes.

In another possible specific implementation manner, the subframe configuration information of the first carrier that is determined by the processor 71 is two bits and the subframe configuration information is used to indicate one of the following subframe configuration cases: all subframes in a current sending period are NCT subframes, all subframes in the current sending period are backward compatible subframes, in the current sending period, a subframe used to transmit a cell-common reference signal is the backward compatible subframe, and another subframe except the subframe used to transmit the cell-common reference signal is the NCT subframe, and a subframe in the current sending period is a subframe configured by using RRC signaling.

It should be noted that, the foregoing first UE is a UE of a new release, or the foregoing first UE is a UE that can support and/or use an NCT subframe.

It should be noted that, the second UE may include a UE that belongs to the first type of UE and/or a UE that belongs to the second type of UE, the first type of UE is a UE that supports a backward compatible subframe, and the second type of UE is a UE that supports an NCT subframe.

According to the base station provided in this embodiment of the present invention, an NCT subframe and a backward compatible subframe are configured on a first carrier, and subframe configuration information of the first carrier is sent to a UE, so that the UE determines a subframe type of a subframe on the first carrier. Therefore, compatibility of the first carrier with a UE of an old release and a UE of a new release is ensured, and both the UE of a new release and the UE of an old release can use the first carrier to perform communication. By using the base station provided in the present invention, an operator can deploy, in a cell in which a UE of an old release exists, an NCT subframe for a UE in the cell to perform communication, so that a carrier performance gain caused by introduction of an NCT can be obtained, carrier resource efficiency and spectrum utilization in the cell can be improved, and deployment of an NCT carrier in an evolution process of LTE is also facilitated.

Embodiment 7

Figure 8:
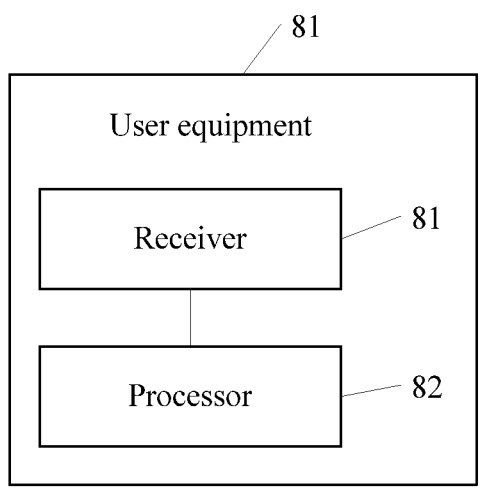
FIG. 8 is a structural block diagram of user equipment according to Embodiment 7 of the present invention.

This embodiment of the present invention provides user equipment UE, which can implement the method of the UE in the embodiments shown in FIG. 1 to FIG. 3. As shown in FIG. 8, user equipment 80 provided in this embodiment includes a receiver 81 configured to receive dynamic signaling sent by a base station, where the dynamic signaling carries subframe configuration information of a first carrier, and the subframe configuration information of the first carrier is used to indicate configuration of an NCT subframe and/or the configuration of a backward compatible subframe on the first carrier, and a processor 82 configured to determine a subframe type of a subframe on the first carrier according to the subframe configuration information in the dynamic signaling received by the receiver 81, where the subframe type of the subframe on the first carrier includes an NCT subframe and/or a backward compatible subframe; and use, according to the subframe type of the subframe on the first carrier, the first carrier to perform communication.

The receiver 81 is specifically configured to periodically receive, according to a set sending period, the dynamic signaling sent by the base station.

Optionally, the receiver 81 is further configured to receive semi-static signaling sent by the base station before the dynamic signaling sent by the base station is received, and to determine, according to the semi-static signaling, to receive the dynamic signaling.

The receiver 81 is specifically configured to receive, through a first physical layer channel, the dynamic signaling sent by the base station, where the dynamic signaling is sent by the base station by using physical layer signaling, and the first physical layer channel uses a same time-frequency resource as that of a physical control format indicator channel PCFICH.

The processor 82 is further configured to determine a first subframe in the sending period, acquire a cell-common reference signal from the first subframe, and demodulate a first physical layer channel according to the cell-common reference signal, where the first subframe is a subframe at a predefined location in each sending period of the first carrier, and the cell-common reference signal is transmitted in the first subframe.

In one possible specific implementation manner, the subframe configuration information of the first carrier that is received by the receiver 81 is one bit and the subframe configuration information is used to indicate one of the following subframe configuration cases: all subframes in a current sending period are NCT subframes and all subframes in the current sending period are backward compatible subframes.

In another possible specific implementation manner, the subframe configuration information of the first carrier that is received by the receiver 81 is two bits and the subframe configuration information is used to indicate one of the following subframe configuration cases: all subframes in a current sending period are NCT subframes, all subframes in the current sending period are backward compatible subframes, in the current sending period, a subframe used to transmit a cell-common reference signal is the backward compatible subframe, and another subframe except the subframe used to transmit the cell-common reference signal is the NCT subframe, and a subframe in the current sending period is a subframe configured by using RRC signaling.

According to the user equipment provided in this embodiment of the present invention, a subframe type of a subframe on a first carrier is determined by using subframe configuration information of the first carrier that is sent by a base station, so that compatibility of the first carrier with a UE of an old release and a UE of a new release can be ensured, and both the UE of a new release and the UE of an old release can use the first carrier to perform communication. By using the user equipment provided in the present invention, an operator can deploy, in a cell in which a UE of an old release exists, an NCT subframe for a UE in the cell to perform communication, so that a carrier performance gain caused by introduction of an NCT can be obtained, carrier resource efficiency and spectrum utilization in the cell can be improved, and deployment of an NCT carrier in an evolution process of LTE is also facilitated.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A carrier configuration method, the method comprising:
configuring a new carrier type (NCT) subframe and/or a backward compatible subframe on a first carrier;
sending a subframe configuration information of the first carrier to a first user equipment (UE) via the first carrier by using dynamic signaling, wherein the subframe configuration information of the first carrier is used by the first UE to determine a subframe type of a subframe on the first carrier according to the subframe configuration information of the first carrier, and wherein the subframe type of the subframe on the first carrier comprises an NCT subframe and/or a backward compatible subframe; and
using, according to the subframe type of the subframe on the first carrier, the first carrier to perform communication,
wherein configuring the NCT subframe and/or the backward compatible subframe on the first carrier according to a service volume of a second UE and a subframe type supported by the second UE comprises:
configuring all subframes on the first carrier as NCT subframes when a total service volume of a first type of UE served by the first carrier is less than a threshold T1, wherein the first type of UE is a UE that supports a backward compatible subframe;
configuring all subframes on the first carrier as backward compatible subframes when a total service volume of a second type of UE served by the first carrier is less than a threshold T2 and a service volume of the first type of UE served by the first carrier is greater than the threshold T1, wherein the second type of UE is a UE that supports an NCT subframe; and configuring both an NCT subframe and a backward compatible subframe on the first carrier when the total service volume of the first type of UE served by the first carrier is greater than or equal to the threshold T1 and the total service volume of the second type of UE served by the first carrier is greater than or equal to the threshold T2.

2. The method according to claim 1, wherein sending the subframe configuration information of the first carrier to the first UE by using dynamic signaling comprises periodically sending, according to a set sending period, the dynamic signaling to the first UE, wherein the dynamic signaling carries the subframe configuration information of the first carrier.

3. The method according to claim 1, further comprising:
before sending the subframe configuration information of the first carrier to first UE by using dynamic signaling, sending semi-static signaling to the first UE, wherein the semi-static signaling is used to instruct the first UE to receive the dynamic signaling.

4. The method according to claim 3, wherein sending semi-static signaling to the first UE comprises:
carrying the semi-static signaling by using a master information block (MIB) or a system information block (SIB); and
sending the semi-static signaling by using the MIB or the SIB; or
sending the semi-static signaling in a unicast manner.

5. A base station comprising:
a processor configured to configure a new carrier type (NCT) subframe and/or a backward compatible subframe on a first carrier; and
a transmitter configured to send, to first user equipment (UE) via the first carrier by using dynamic signaling, a subframe configuration information of the first carrier, wherein the subframe configuration information of the first carrier is used by the first UE to determine a subframe type of a subframe on the first carrier according to the subframe configuration information of the first carrier, wherein the subframe type of the subframe on the first carrier comprises an NCT subframe and/or a backward compatible subframe,
wherein the base station is configured to use, according to the subframe type of the subframe on the first carrier, the first carrier to perform communication,
wherein NCT subframe and/or the backward compatible subframe on the first carrier is configured according to a service volume of a second UE and a subframe type supported by the second UE, and
wherein the processor is specifically configured to:
configure all subframes on the first carrier as NCT subframes when a total service volume of a first type of UE served by the first carrier is less than a threshold T1, wherein the first type of UE is a UE that supports a backward compatible subframe;
configure all subframes on the first carrier as backward compatible subframes when a total service volume of a second type of UE served by the first carrier is less than a threshold T2 and a service volume of the first type of UE served by the first carrier is greater than the threshold T1, wherein the second type of UE is a UE that supports an NCT subframe; and
configure both an NCT subframe and a backward compatible subframe on the first carrier when the total service volume of the first type of UE served by the first carrier is greater than or equal to the threshold T1 and the total service volume of the second type of UE served by the first carrier is greater than or equal to the threshold T2.

6. The base station according to claim 5, wherein the transmitter is specifically configured to periodically send, according to a set sending period, the dynamic signaling to the first UE, and wherein the dynamic signaling carries the subframe configuration information of the first carrier.

7. The base station according to claim 5, wherein the transmitter is further configured to send semi-static signaling to the first UE before sending the dynamic signaling to the first UE, and wherein the semi-static signaling is used to instruct the first UE to receive the dynamic signaling.

8. The base station according to claim 7, wherein the transmitter is specifically configured to:
add the semi-static signaling to a master information block (MIB) or a system information block (SIB), and send the semi-static signaling by using the MIB or the SIB; or
send the semi-static signaling in a unicast form.

9. The base station according to claim 5, wherein the transmitter is specifically configured to send the dynamic signaling by using physical layer signaling, and wherein the physical layer signaling is sent through a first physical layer channel.

10. An user equipment (UE) comprising:
a receiver configured to receive dynamic signaling sent by a base station via a first carrier, wherein the dynamic signaling carries subframe configuration information of the first carrier, and wherein the subframe configuration information of the first carrier is used to indicate configuration of an NCT subframe and/or the configuration of a backward compatible subframe on the first carrier,
a processor configured to determine a subframe type of a subframe on the first carrier according to the subframe configuration information in the dynamic signaling received by the receiver,
wherein the subframe type of the subframe on the first carrier comprises the NCT subframe and/or the backward compatible subframe,
wherein the subframe configuration information includes:
all subframes on the first carrier are configured as NCT subframes when a total service volume of a first type of UE served by the first carrier is less than a threshold T1, wherein the first type of UE is a UE that supports a backward compatible subframe;
all subframes on the first carrier are configured as backward compatible subframes when a total service volume of a second type of UE served by the first carrier is less than a threshold T2 and a service volume of the first type of UE served by the first carrier is greater than the threshold T1, wherein the second type of UE is a UE that supports an NCT subframe; and
both an NCT subframe and a backward compatible subframe are configured on the first carrier when the total service volume of the first type of UE served by the first carrier is greater than or equal to the threshold T1 and the total service volume of the second type of UE served by the first carrier is greater than or equal to the threshold T2, and
wherein the processor is configured to use, according to the determined subframe type the first carrier to perform communication.

11. The UE according to claim 10, wherein the receiver is specifically configured to periodically receive, according to a set sending period, the dynamic signaling sent by the base station.

12. The UE according to claim 10, wherein the receiver is further configured to:
 receive semi-static signaling sent by the base station before the dynamic signaling sent by the base station is received; and
 determine, according to the semi-static signaling, to receive the dynamic signaling.

13. The UE according to claim 10, wherein the receiver is specifically configured to receive, through a first physical layer channel, the dynamic signaling sent by the base station, and wherein the first physical layer channel uses a same time-frequency resource as that of a physical control format indicator channel (PCFICH).

14. The UE according to claim 10, wherein the processor is further configured to determine a first subframe in a sending period, acquire a cell-common reference signal from the first subframe, and demodulate a first physical layer channel according to the cell-common reference signal, and wherein the first subframe is a subframe at a predefined location in each sending period of the first carrier, and the cell-common reference signal is transmitted in the first subframe.

15. The UE according to claim 10, wherein the subframe configuration information of the first carrier that is received by the receiver is one bit, and wherein the subframe configuration information is used to indicate one of the following subframe configuration cases:
 all subframes in a current sending period are NCT subframes; and
 all subframes in the current sending period are backward compatible subframes.

16. The UE according to claim 10, wherein the subframe configuration information of the first carrier that is received by the receiver is two bits, and wherein the subframe configuration information is used to indicate one of the following subframe configuration cases:
 all subframes in a current sending period are NCT subframes;
 all subframes in the current sending period are backward compatible subframes;
 in the current sending period, a subframe used to transmit a cell-common reference signal is the backward compatible subframe, and another subframe except the subframe used to transmit the cell-common reference signal is the NCT subframe; and
 a subframe in the current sending period is a subframe configured by using RRC signaling.

* * * * *